US007676223B2

(12) United States Patent
Das et al.

(10) Patent No.: US 7,676,223 B2
(45) Date of Patent: Mar. 9, 2010

(54) METHOD FOR CONTROLLING A FLOW OF INFORMATION BETWEEN SECONDARY AGENTS AND A MOBILE DEVICE IN A WIRELESS COMMUNICATIONS SYSTEM

(75) Inventors: Suman Das, Scotch Plains, NJ (US); Thierry E. Klein, Fanwood, NJ (US); Kin K. Leung, London (GB); Sayandev Mukherjee, Plainsboro, NJ (US); George E. Rittenhouse, Holmdel, NJ (US); Louis Gwyn Samuel, Sindon (GB); Harish Viswanathan, Basking Ridge, NJ (US); Haitao Zheng, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 915 days.

(21) Appl. No.: 10/941,050

(22) Filed: Sep. 13, 2004

(65) Prior Publication Data
US 2007/0191054 A1 Aug. 16, 2007

(51) Int. Cl.
*H04B 7/00* (2006.01)
(52) U.S. Cl. .................. 455/422.1; 455/445; 455/525; 370/235
(58) Field of Classification Search .............. 455/453, 455/438, 440, 525, 524, 420, 419, 507, 445, 455/422.1, 560, 561, 436–437, 439, 452.1; 370/235, 352
See application file for complete search history.

(56) References Cited
U.S. PATENT DOCUMENTS

| 5,384,826 | A | * | 1/1995 | Amitay .................... 455/436 |
| 5,953,667 | A |   | 9/1999 | Kauppi et al. |
| 6,125,278 | A | * | 9/2000 | Wieczorek et al. ......... 455/437 |
| 6,539,220 | B1 | * | 3/2003 | Sakai et al. ................ 455/420 |
| 6,985,463 | B1 | * | 1/2006 | Wright et al. .............. 370/331 |
| 7,082,114 | B1 | * | 7/2006 | Engwer et al. ............. 370/331 |
| 7,158,492 | B2 | * | 1/2007 | Haverinen ................. 370/328 |
| 7,339,928 | B2 | * | 3/2008 | Choyi et al. ............... 370/390 |

(Continued)

FOREIGN PATENT DOCUMENTS

EP 1071305 A 1/2001

(Continued)

OTHER PUBLICATIONS

International PCT Search Report, PCT/US2004/030110 dated Aug. 3, 2005.

*Primary Examiner*—George Eng
*Assistant Examiner*—Brandon J Miller
(74) *Attorney, Agent, or Firm*—Williams, Morgan & Amerson, PC

(57) ABSTRACT

In one aspect of the present invention, a method for controlling a communications session with a mobile device is provided. The method comprises selecting a plurality of base stations, where at least a portion of the base stations are adapted to operate as a secondary agent, and wherein the secondary agent is capable of communicating with a mobile device. Substantially similar data is then delivered to a plurality of the secondary agents, and a first one of the secondary agents is selected as a first serving secondary agent to communicate with the mobile device. The first serving secondary agent transfers the data to the mobile device during the communications session.

11 Claims, 12 Drawing Sheets

U.S. PATENT DOCUMENTS

| | | | |
|---|---|---|---|
| 7,457,266 B2 * | 11/2008 | Semper et al. | 370/331 |
| 2002/0086674 A1 * | 7/2002 | Jung | 455/436 |
| 2003/0017838 A1 * | 1/2003 | Kayama et al. | 455/525 |
| 2003/0054812 A1 | 3/2003 | Hunzinger | |
| 2003/0078045 A1 * | 4/2003 | Norstrom et al. | 455/436 |
| 2004/0213181 A1 * | 10/2004 | Grech et al. | 370/331 |

FOREIGN PATENT DOCUMENTS

| | | |
|---|---|---|
| WO | WO98/59516 A | 12/1998 |

* cited by examiner

METHOD FOR CONTROLLING A FLOW OF INFORMATION BETWEEN SECONDARY AGENTS AND A MOBILE DEVICE IN A WIRELESS COMMUNICATIONS SYSTEM

BACKGROUND OF THE INVENTION

1. Field of the Invention

This invention relates generally to telecommunications, and more particularly, to wireless communications.

2. Description of the Related Art

The wireless industry and the Internet are converging. In wireless cellular technology, this convergence is embodied in Time Division Multiple Access (TDMA) based technology, particular beginning with second-generation systems, such as the European Telecommunications Standards Institute (ETSI) General Packet Radio Service (GPRS). Alternatively, in Code Division Multiple Access (CDMA) based systems, this convergence is achieved via new standards, such as 3rd Generation Partnership Project's (3GPP's) Universal Mobile Telecommunications System (UMTS) standard or via the evolution of existing Second Generation (2G) CDMA standards, such as IS95 in the form of CDMA 2000. These systems are intended to convey data as well as legacy voice traffic. Looking to the future, new communication systems are in the process of being defined and are currently termed fourth generation systems (4G). These 4G systems are typically characterized by high bandwidths and small cell size. The aim of these 4G systems is to be able to provide Internet connectivity, including transparent access to the Internet, while also providing a plethora of services and applications seamlessly via a variety of air interfaces to the users while the user roams around the variety of cellular systems. This type of future scenario is very heterogeneous in characteristic and is captured by the International Telecommunication Union Radiocommunication sector (ITU-R).

These proposed 4G systems suffer from a variety of shortcomings, including the fact that the current cellular architectures will be required to be heavily modified to provide desired interconnectivity and services. These modifications will result in cellular architectures that are exceedingly complex, and thus, expensive to construct and maintain.

A standard approach to providing cellular access involves adopting a hierarchical architectural approach to gain access to Public Switched Telephone Networks (PSTNs) or the Internet. This type of solution is epitomized through the presentation and management of a variety of interfaces that add to the complexity of the system. In these architectures, the entry point to the system is physically remote from the exit point at the air interface. Moreover, typically, Radio Link Protocols (RLP) that characterize the type of cellular system are split over two or more network elements. For example, the RLP is split between the base station (BTS or NodeB) and the Radio System/Network Controller (RSC/RNC). Additionally, the control elements of these networks are again split over a number of network elements. For example, in a Global System for Mobile communications (GSM) system the control elements are distributed over the Base Station Controllers (BSCs) and the Mobile-services Switching Center (MSC), or in the case of GPRS, the control elements are distributed over the BSC and the Serving GPRS Support Node (SGSN). In UMTS, a similar split would occur over the RNC and MSC for voice traffic or the RNC and SGSN for packet data. As can be seen, there are splits in both the control and user planes. These splits were originally implemented to solve technological problems that arose from limited processing power and the limited availability of bandwidth of transmission systems between the network elements. These splits imply that it was desirable to have the RNC oversee many BTSs. Similarly, a number of RNCs are controlled by a central data distributor, such as the MSC or the SGSN. In short, past processing capabilities were sufficiently expensive that for the cellular system to be viable, the processing had to be split across a variety of network elements.

There have been other approaches in wireless connectivity that have principally addressed the need for broadband wireless access, such as Hiperlan, and 802.11 based systems. Some prior attempts have tried to tie in cellular aspects to the general idea of broadband access but they did not address the backward compatibility of the air interfaces, while the others are mainly directed to the Media Access Control (MAC) layer and the physical layer and do not address the generic aspects of cellular systems in regard to radio resource management or mobility across a controlled cellular network. Both systems could be considered as orthogonal systems that are provided to complement the cellular network, and hence cannot be considered as a simplification to the cellular system.

Generally, there are at least three significant shortcomings associated with the solutions described above. First, scalability of the system is significantly limited. In a traditional cellular network, increased capacity of the system may be obtained by adding BTSs. BTSs, however, may not be simply added to the system without eventually creating a need for additional elements in the system. For example, as the capacity of RNCs becomes saturated, the addition of another BTS would require more RNCs. This argument also recurses upward to the MSCs, SGSNs, etc. Accordingly, this approach has a relatively high cost with regard to the amount of equipment needed to build the solution as capacity limits are reached. Moreover, this problem will also be exacerbated by the tendency toward small cells as advocated by prior systems. Also, a new BTS will start off supporting a lighter load than the existing BTSs, thereby leading to inefficient use of the resources in the wireless network.

Second, flexibility of the system is significantly limited. The second problem with traditional cellular networks is that the existing solutions are not designed to allow the use of equipment using different radio interfaces. That is, although provision is made to hand-over from other radio interfaces, direct access to future types of interfaces is not provided.

Third, the system becomes exceedingly complex. Both of the above problem areas combine to make the present solutions complex or at least overly complicated in the sense of future development of a network. That is, each new generation typically requires that a new infrastructure be developed, such as in the case of UMTS. This complexity may then necessitate high capital expenditures to create the new infrastructure. A second form of complexity arises out of the management of the numerous interfaces that these systems present. This type of complexity is reflected in higher operational expenditures.

Wireless communications systems are becoming an increasingly integral aspect of modem communications. To ensure Quality of Service (QoS) and end-user satisfaction, efficient resource allocation and management strategies are required. While traditional wireless networks have primarily carried voice traffic, current and next-generation wireless networks are becoming increasingly data-centric due to the increased popularity of data applications using protocols such as the Transmission Control Protocol (TCP). As such, future wireless networks must increasingly be able to efficiently allocate resources between both voice and data traffic. However, such efficiency can be difficult to achieve because data applications are fundamentally different from traditional voice applications, both in terms of the traffic characteristics and the QoS requirements. This difference stems from the fact that, in general, voice applications typically require a constant transmission rate, independent of the network loading and the wireless channel quality. Reliable communication in such voice applications is generally achieved through power control to alleviate adverse channel conditions. On the other hand, in data applications, performance as perceived by the end-user is closely related to the network-layer throughput, the transaction time for initiating a connection and the transaction time for transmitting the data. Both the throughput and transaction time for data transmissions are dependent upon the channel quality, the network load and the resource allocation (scheduling) strategy.

Data applications are typically more delay-tolerant than voice applications and are able to accept a marginal increase in delay to achieve improved long-term throughput and greater energy efficiency. For example, email communications are much less sensitive to delays and interruptions in transmission than are voice communications. Internet access and file transfers, likewise, can tolerate a bursty communications channel, as long as reasonable response times and reasonable average throughputs are maintained. Further, due to increased buffering typically available on data devices relative to voice devices, and due to the substantially unidirectional nature of the communications, even streaming data applications exhibit a greater robustness to data interruptions than do voice communications. This relatively high delay tolerance of data traffic, in addition to the bursty nature of data traffic (i.e., packets of data in a transmission tend to be transmitted in bursts), allows for flexible transmission scheduling strategies to achieve greater efficiency of the limited network resources.

The present invention is directed to overcoming, or at least reducing, the effects of, one or more of the problems set forth above.

SUMMARY OF THE INVENTION

In one aspect of the present invention, a method for controlling a communications session with a mobile device is provided. The method comprises selecting a plurality of base stations, where at least a portion of the base stations are adapted to operate as a secondary agent, and wherein the secondary agent is capable of communicating with a mobile device. Substantially similar data is then delivered to a plurality of the secondary agents, and a first one of the secondary agents is selected as a first serving secondary agent to communicate with the mobile device. The first serving secondary agent transfers the data to the mobile device during the communications session.

In another aspect of the present invention, a method for controlling a communications session with a mobile device is provided. The method comprises selecting a plurality of base stations, where at least a portion of the base stations are adapted to operate as a secondary agent, and wherein the secondary agent is capable of communicating with a mobile device. Data is then delivered to a first one of the secondary agents, which operates as a first serving secondary agent to communicate with the mobile device. The first serving secondary agent transfers the data to the mobile device during the communications session. A second one of the secondary agents is selected as a second serving secondary agent to communicate with the mobile device in replacement of the first serving secondary agent, and an undelivered portion of the data is transferred from the first one of the secondary agents to the second one of the secondary agents

BRIEF DESCRIPTION OF THE DRAWINGS

The invention may be understood by reference to the following description taken in conjunction with the accompanying drawings, in which like reference numerals identify like elements, and in which.

Figure 1:
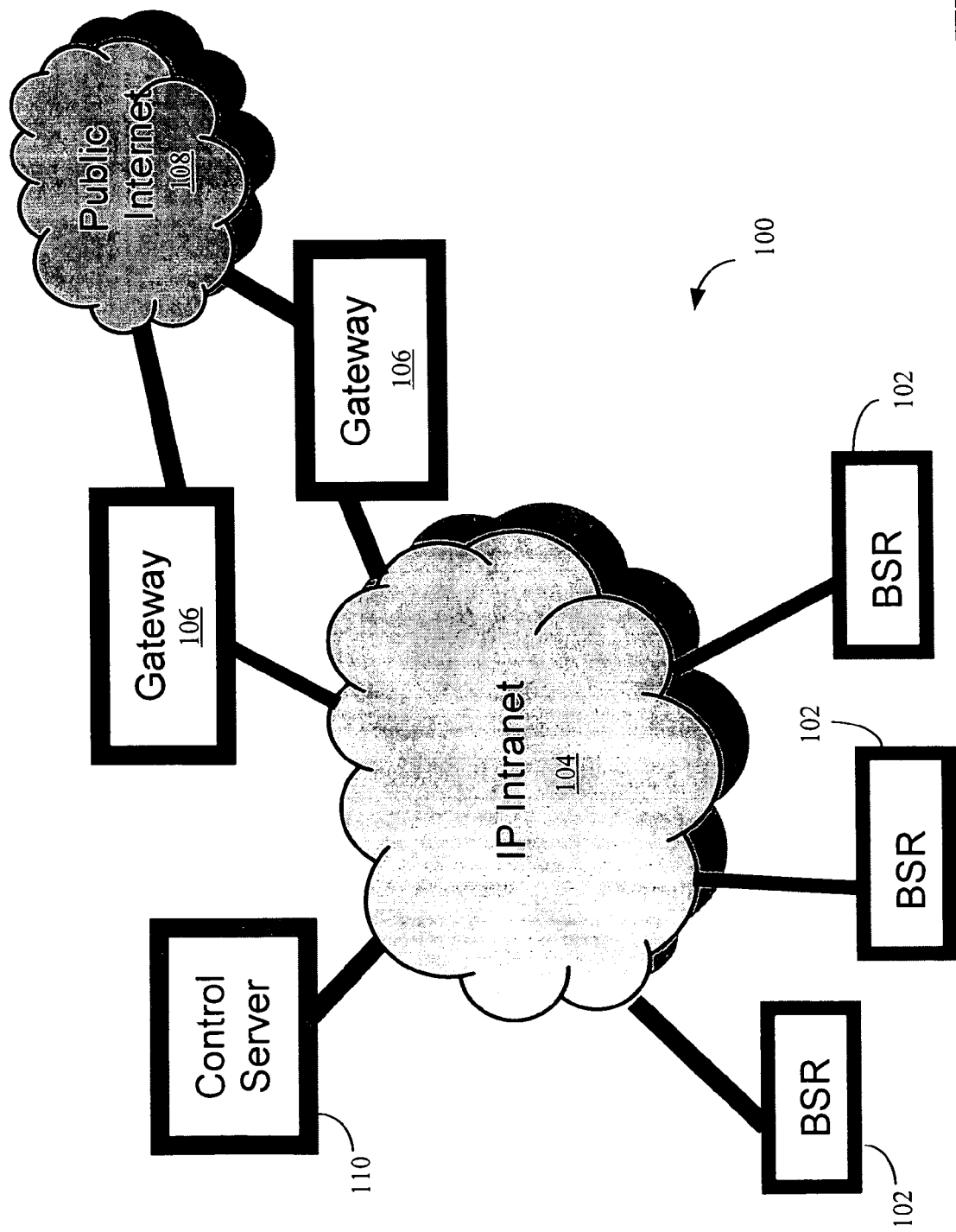
FIG. 1 stylistically depicts an exemplary telecommunications system that implements an all-IP network Architecture using Base Station Routers (BSRs)

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

There are several aspects of the instant invention, each of which tends to arise from the notion of a Base Station Router (BSR). The BSR moves away from a traditional centralized and hierarchical cellular architecture to a migratable distributed cellular architecture, as is discussed in greater detail below in conjunction with the accompanying drawings.

Turning now to the drawings, and specifically referring to FIG. 1, a communications system 100 employing an exemplary all-Internet Protocol (all-IP) network architecture is stylistically illustrated, in accordance with one embodiment of the present invention. Generally, the system 100 is comprised of a plurality of BSRs 102. The BSRs 102 are connected to an Intranet 104 (also referred to as the backhaul network). Gateways 106 connect the Intranet 104 to the Internet 108. In an exemplary embodiment of the instant invention, Internet Protocol (IP) is a network protocol that may be used to transport user and control information within the Intranet 104. A control server 110 provides call service control. One significant characteristic of the exemplary communications system 100 is that a substantial portion of the radio network functionalities are integrated with the base station functionalities and are thus distributed across the network.

Third generation CDMA cellular networks are designed to support both voice and data services. Enhancements to packet data transport through high-speed shared channels (HSDPA in UMTS, EV-DV in CDMA 2000) are currently being standardized. In these systems, voice traffic is carried in traditional circuit-switched mode while data is carried through scheduled-mode shared channels in the form of packet switching. However, to provide a rich multimedia session, it is beneficial to have a single mode of transport for all services. This simplifies call control and reduces equipment cost for supporting multimedia user experience. Such a convergence is also seen in wire-line networks where voice communication is increasingly migrating to voice-over-IP (VoIP) format. Thus, for purposes of illustration the instant invention is described in the context of a CDMA system that only supports a shared transport channel, such as in the CDMA 2000 1x EV-DO system, as the wireless interface. Those skilled in the art will appreciate that aspects of the instant invention may be implemented in other types of communications systems without departing from the spirit and scope of the instant invention. Those skilled in the art will further appreciate that, whatever system is chosen to implement aspects of the instant invention, it would be useful for such a system to be capable of delivering the quality of service (QoS) required to carry real-time traffic, such as VoIP traffic.

In an exemplary embodiment of the instant invention, Fast Cell-Site Selection (FCSS) is employed to achieve delay constraints for users particularly near the edges of cells, thereby enhancing VoIP capacity in the absence of soft handoff on the shared channels in a CDMA system. FCSS refers to a procedure that allows rapid switching of the transmission for a call from one base station with a weak radio link to another with a better link, thereby harnessing the advantage of the time-varying channel quality of the wireless link. Thus, FCSS is also referred to simply as cell switching here. In some applications, it may be possible to avoid soft handoffs without significant loss in capacity, provided that FCSS is employed. The instant invention exploits this fact in the use of an architecture that allows fast switching between cells rather than soft handoff. This eliminates the need for tight synchronization between base stations and framing protocols between nodes to guarantee strict latency requirements (even when the application does not require it), as would otherwise be required for soft handoffs. Although soft handoff is proposed for the data channel on the reverse link in current CDMA systems, aspects of the instant invention may be employed on the reverse link instead of frame selection or soft handoff to simplify the architecture. With channel-aware scheduling on the reverse link, the loss of diversity from not implementing soft handoff is somewhat compensated by multi-user diversity that is achieved by only transmitting when a user's channel is relatively good.

Several proposals for IP RAN and for micro-mobility management have been published in the literature, including Hierarchical Mobile IP (HMIP), HAWAII, Cellular IP, and BCMP (Brain Candidate Mobility Protocol). However, these proposals do not specifically address issues that arise in a CDMA system and are not tailored to a CDMA network. In particular, they do not address the issue of ping-pong of a mobile between base stations in the case of rapid signal fluctuations from the different base stations. Seamless transfer of radio link protocol information was also not considered. In a CDMA system, universal frequency reuse is employed to maximize capacity, and thus interference can come from an immediate neighboring base station. Further, the radio link from a base station that can best serve a given mobile, as reflected by its best signal-to-interference-plus-noise ratio (SINR) among adjacent base stations, could be rapidly changing even when the mobile is stationary because of time-varying channel fading. Thus handoffs are not only driven by user mobility but by signal propagation characteristics as well. Any mobility management architecture must be designed for a significant number of handoffs between a small set of base stations. In a scenario with frequent handoffs, it becomes useful to ensure that the handoff process is fast, lossless and efficient.

The current generation of cellular networks supports mobility management with associated requirements of low packet loss and low handoff delay through a centralized architecture. While it is possible to consider IP transport within the centralized architecture, a distributed architecture with decentralized control is preferable from the perspective of scalability and robustness. In the centralized architecture for CDMA systems, the radio network controller (which typically serves a large number of base stations) performs the following functions: load and congestion control of individual cells, admission control in simplex and soft handoff modes, CDMA code tree management for individual cells, management and configuration of individual cells, mapping of traffic to appropriate physical channels, macro-diversity combining and distribution for soft handoff, outer loop power control for soft handoff on the reverse link, paging coordination and mobility management. Among these different functionalities, the ones specific to individual cells such as code allocation management, congestion control, and admission control in simplex mode can be straightforwardly distributed to the base stations as these functions do not require interactions among base stations. However, functionalities related to soft handoff, paging and mobility management require signaling between base stations when distributed and thus careful design of the architecture to facilitate these functions is useful. Besides being distributed, the proposed architecture is all-IP in the sense that IP-based protocols are used for transport of data and signaling within the radio access network.

Mobile IP has been standardized for macro-mobility management in IP networks. Several extensions to Mobile IP may be used to support micro-mobility and low-latency, low-loss handoffs in wireless networks. Examples include the above-mentioned HAWAII, Cellular IP, and Hierarchical Mobile IP (HMIP). In an illustrated exemplary embodiment of the instant invention, the framework of HMIP with route optimization is employed for implementing mobility management. While the exemplary embodiment employs HMIP as the framework, enhancements to the mobility management that are driven by the CDMA air-interface can also be applied to other micro-mobility management protocols. In the illustrated embodiment, HMIP is enhanced to support FCSS with seamless RLC transfers and header compression that are specific to a CDMA system.

Figure 2:
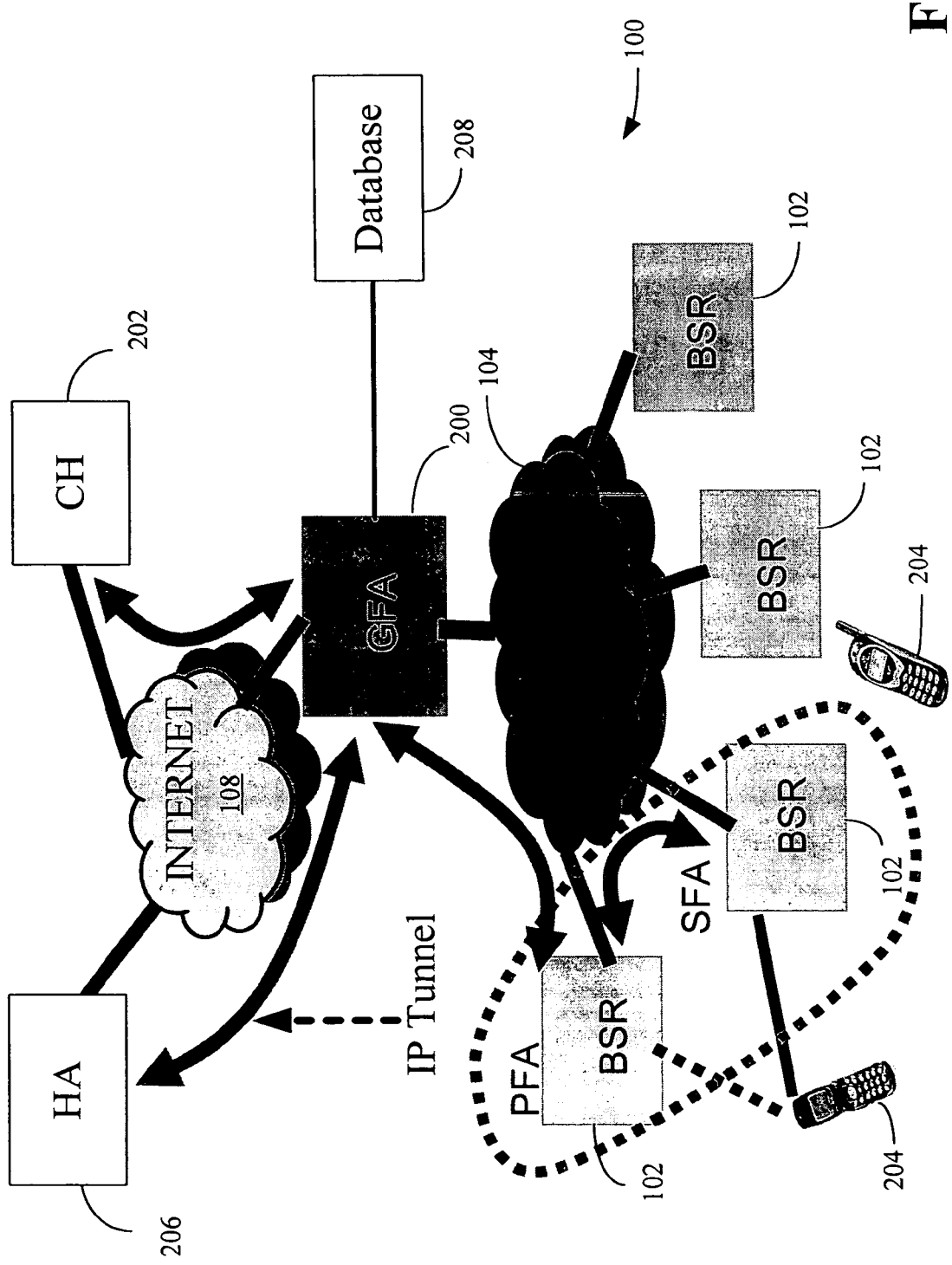
FIG. 2 stylistically depicts an exemplary mobility management structure that may be employed in the telecommunications system of FIG. 1.

A proposed exemplary architecture is illustrated in FIG. 2. A gateway foreign agent (GFA) 200 is located at the boundary of the radio access network and the Internet. Packets are hierarchically tunneled from a correspondent host (CH) 202 to the BSRs 102 through the GFA 200. A network active set (NAS) is defined as consisting of the set of BSRs 102 between which a mobile 204 can switch on a fast time scale. BSRs 102 are added or deleted from the NAS on a slow time scale, based on certain criteria for the link quality between the mobile 204 and the added or deleted BSR 102. Within the NAS, one of the BSRs 102 is called the primary foreign agent (PFA) while the other BSRs 102 are called the secondary foreign agents (SFA). The PFA serves as the anchor for mobility and radio resource management and performs functions similar to the radio network controller (RNC) in the traditional architecture. A database 208 collecting all the user location information is connected to the GFA 200. In another embodiment of the instant invention, the location database 208 is a separate entity located in the network and connected to the GFA 200.

It is worth noting that the PFA and SFAs are logical entities for performing various network control functions and physically, they all are BSRs 102. In the proposed architecture, one and only one BSR 102 in the NAS is serving each mobile 204 at a time and that is referred as the serving BSR 102. As a result, it is possible that the PFA, SFAs and the serving BSR 102 correspond to the same BSR 102 for a given mobile 204. Further, different BSRs 102 can serve as the PFA for different mobiles 204, unlike in the traditional architecture where a single RNC performs the resource management for all of the mobiles 204. In addition, due to user mobility, different BSRs 102 may serve as the PFA for that particular user at different times during the connection. Relocation of the PFA functionalities from one BSR to another during the mobile's connection to the network is discussed in greater detail below. Thus, the resource management function is distributed across the network. The NAS is similar to the active set in a CDMA system defined for soft handoff. However, in FCSS, only one BSR 102 within the NAS transmits at any given time, unlike in soft handoff for which several base stations simultaneously transmit to and receive from the same user. Nevertheless, all BSRs 102 in the NAS are assigned air-interface resources and maintain some RLC state information for the mobile 204 so that they can immediately transmit if they become the serving BSR 102.

At least some of the significant features of the proposed architecture include:

1) The radio network control functionalities such as call admission control, CDMA code tree management, and paging control, are distributed to the different base station routers (BSRs) 102 in the network.
2) IP is used as the transport protocol to carry all data and signaling traffic between the different nodes.
3) Maintaining a gateway foreign agent (GFA) as in HMIP at the root of the domain which serves one, or more than one, location or paging area.
4) Maintaining a network active set (NAS) of base stations for enabling fast cell site selection (FCSS) for each mobile.
5) A primary foreign agent (PFA) serves as the mobility anchor and the PPP/PDCP initiation/termination point. Header compression, if enabled, is implemented at the PFA.
6) A split RLC implementation in which the RLC function is split between the PFA and SFA, as described in more detail below.
7) PFA multicasts forward-link user data to all the SFAs or selectively a subset of SFAs in the NAS. The subset can be chosen dynamically and intelligently by the PFA based on system loading, channel characteristics and mobile mobility pattern.
8) Separate transmitting and receiving BSRs may be associated with any given mobile. In general, the cell switching can be independent on the forward and reverse links since the BSR to which the mobile has the best channel quality on the forward and reverse links need not be the same on both links. In another embodiment, the same BSR could be used as the serving BSR for both the forward and the reverse links.
9) Packet forwarding mechanisms as in MIP route optimization to ensure smooth relocation of the PFA as the mobile moves through the network. Additionally, in one embodiment, whenever feasible, the PFA relocation is implemented in an opportunistic way when the mobile is in the dormant state and thus packets are not buffered in the network. The PFA relocation is optimized according to different mechanisms and different objectives that govern the tradeoff between routing efficiency and overhead associated with too many PFA relocations.
10) Maintaining Radio Resource Control (RRC) and call-processing signaling between the mobile and the network to enable mobility management without any Layer 3 messages. This requires introduction of proxy registration messages into MIP so that the BSR can register with the home agent on behalf of the mobile node.
11) In one embodiment of the instant invention, the QoS for control signals and relevant data transfers on the backhaul network to enable FCSS is ensured using quasi-static multi-protocol label switching (MPLS) paths between base stations. In other embodiments, different mechanisms for ensuring QoS in the backhaul network, such as IntServ and DiffServ are envisioned in this application.
12) Distributed registration and paging are supported, enabled and facilitated by the proposed distributed network architecture.

It may be useful to consider the steps involved in initiating a call and how it proceeds in the proposed architecture. Consider a mobile 204 that powers up in the vicinity of a set of BSRs 102. As in a standard CDMA system, the mobile 204 acquires the pilot signals from the BSRs 102 and uses an access channel to communicate with the BSR 102 from which it received the strongest signal to initiate a session. The BSR 102 that receives the mobile's signal then performs admission control, and, if it admits the user, establishes resources for the mobile 204. The BSR 102 that receives the mobile's signal is designated to be the PFA for this mobile 204. Assume for the purpose of illustration that the mobile 204 already has an IP address assigned to it that is topologically valid in the current network where it powered up. (If not, the mobile 204 can then obtain a topologically valid IP address through a local DHCP (not shown) and this MIP signaling will not be required.) The mobile 204 then registers with this IP address to the BSR 102, which in turn sends hierarchical MIP proxy registration messages to the GFA and to a Home-Agent (HA) 206 of the mobile 204. When the mobile 204 receives a neighboring BSR pilot with signal strength above a certain threshold, it sends an RRC signal to request the addition of this BSR 102 to the NAS in the same way as in a traditional CDMA system for soft handoff. This RRC signal is processed by the PFA, and the PFA then adds the indicated BSR 102 to the NAS and configures it as an SFA by HMIP proxy registration and response messages (with the mobile 204 as the source and PFA as the next level foreign agent). The correspondent host (CH) 200 that sends a packet addressed to the mobile 204 is first routed to the home network and intercepted by the HA 206. The HA 206 then tunnels the packet to the GFA 200, which in turn tunnels the packet to the PFA. The PFA performs header compression (if enabled) and forwards the packet to the serving BSR 102 for transmission over the air. As the mobile 204 moves or as the signal strength changes, the serving BSR 102 can change rapidly according to the FCSS protocol described below. Periodically, as the mobile 204 moves over a larger distance, the PFA is relocated using context transfer protocols, as described immediately below.

A significant aspect of the mobility management is the relocation of the PFA functionality as the mobile 204 moves through the network. The purpose of the PFA relocation is to transfer the PFA functionalities and responsibilities as the "anchor" for the mobile 204 from the current PFA to an SFA in the NAS. In the absence of PFA relocations, packets would have to be forwarded from the PFA to the serving BSR 102 in the NAS that could become topologically distant from the PFA as the mobile 204 moves. On the other hand, frequent PFA relocations would generate a significant amount of signaling traffic and additional delay on the backhaul network. Thus, there is a tradeoff involved in determining how frequently PFA relocations should be done, and may depend on any of a variety of factors of the particular network and the values of the system parameters, such as the degree of connectivity in the network, the bandwidth available in the backhaul network and the QoS requirements under consideration. If the network is highly connected in a mesh so that any BSR 102 is able to reach another BSR 102 with a small number of hops, then the delay incurred from forwarding data from a PFA is not large even without frequent relocations. If sufficient bandwidth is available and transmission delay is not a concern, frequent relocations are again not required. The signaling protocol for relocating the PFA (called the O-PFA) to an SFA within the NAS (then called the N-PFA) that could potentially be actively transmitting or receiving at the time of relocation is described herein. The node that should become the new PFA can be optimized for any given network architecture.

Figure 3:
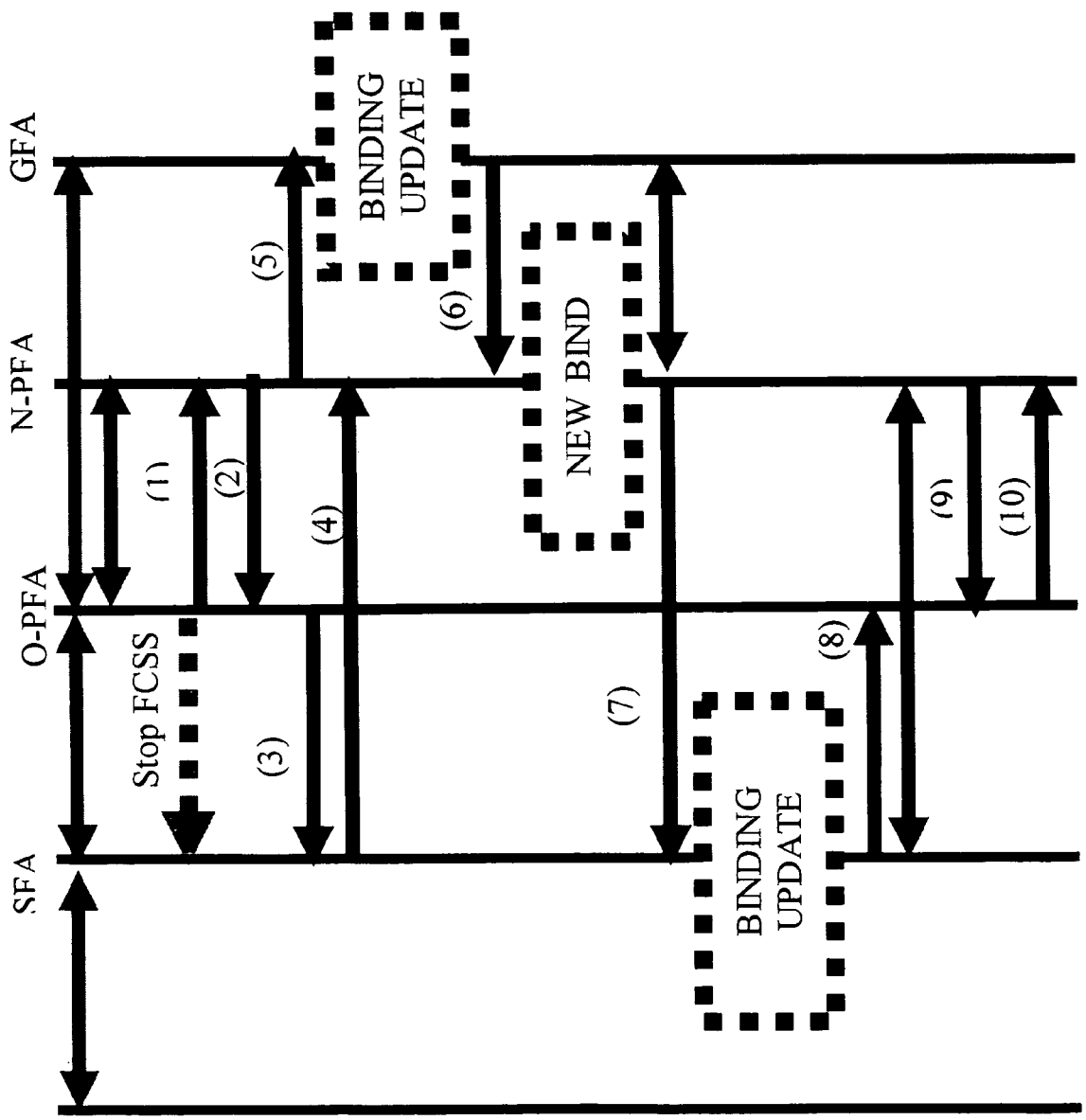
FIG. 3 stylistically depicts a signal flow associated with a reallocation of a Primary Foreign Agent (PFA) within the telecommunications system of FIG. 1.

The signaling flow for PFA relocation is shown in FIG. 3.
1) Upon deciding to perform a PFA relocation, O-PFA sends a proxy binding update request message to the N-PFA indicating a care-of-address (CoA) of the mobile 204 and the GFA address. All relevant state information is also carried as a part of this message.
2) N-PFA responds with an Acknowledgment (Ack) to indicate availability of resources to accept the role of PFA and creates necessary structures to store the state information. N-PFA stops forwarding reverse link packets to O-PFA.
3) O-PFA, on receiving the Ack, starts forwarding the forward and reverse link packets to the N-PFA while also temporarily retaining them in the buffer. O-PFA sends proxy messages to the other SFA(s) to indicate that they should re-register with the N-PFA.
4) SFA(s) send registration request message to the N-PFA to create binding.
5) N-PFA registers (regional registration) with the GFA 200 that results in a binding update at the GFA 200.
6) Registration Response from the GFA 200.
7) Registration Response to SFA(s) from N-PFA.
8) Response from SFA(s) to O-PFA indicating binding update.
9) Response from N-PFA to O-PFA indicating the success or failure of the binding updates at the various nodes.
10) Completion of transfer message from O-PFA to N-PFA indicating completion of forwarding of all forward and reverse link packets. O-PFA empties all buffers and removes state information.

The main objective of FCSS is to track channel fading of multiple cell sites and select the cell with the best channel quality to serve a mobile 204, thereby achieving cell site diversity and higher link throughput. FCSS is thus similar to hard handoff between base stations in that, at any given time, there is exactly one serving base station that supports a given mobile. However, the principal difference between FCSS and hard handoff is that for each mobile in the FCSS scheme, we propose to maintain an active set of BSRs 102 that include the BSR 102 with the best pilot SINR (as received at the mobile) and all other BSRs 102 with link loss to the mobile within some threshold of that for the BSR 102 with the best SINR. Since there is no active set for hard handoff, it takes much longer to switch from one base station to another. For the forward link, FCSS theoretically could lead to a substantial improvement in capacity compared to conventional hard handoff.

In the illustrated embodiment, each mobile 204 is responsible for initiating cell switching for both forward and reverse link. Specifically, each mobile 204 monitors channel quality for all links from the BSRs 102 in the active set, selects the best one according to pre-specified criteria and broadcasts the selected cell identity via reverse link signaling. To reduce unnecessary cell switching (i.e., ping-pong effects), it is desirable to use a form of time-averaged channel quality to select the best BSR 102.

Note that this approach has its shortcoming; namely, the switching decision by the mobile 204 is based on channel quality without considering any other factors such as traffic loading and resource consumption. Utilizing a central controller (for example, PFA) for decision-making would allow dynamic load balancing and cell coordination. However, it suffers from high delay in switching between cell sites due to excessive signaling. Hence, in addition to initiating cell switching by the mobile 204, it is also proposed that, for example, in case of traffic overload at the new cell site selected by the mobile 204, the PFA, upon receiving such a signaling message, can signal the mobile 204 to cancel the chosen cell switch. In one embodiment of the instant invention, it is envisioned that, if the initial cell selection is rejected, the mobile 204 may select the next best cell-site according to the specified criterion and inform the PFA of its selection. Alternatively, rather than potentially going through this iterative procedure for selecting the cell-site, the mobile 204 may provide an ordered list of cell-sites to the PFA and let the PFA make the selection based on network-wide criteria, such as traffic loading.

In general, two different BSRs 102 can be selected as the serving BSRs 102 for the forward and reverse links for a given mobile 204. Since the channel qualities of the forward and reverse links typically fluctuate independently of each other in time, such a selection allows the FCSS gain to attain its fullest extent. Nevertheless, a single active set can be maintained for both forward and reverse links for operation simplicity. Since the mobile 204 can monitor the channel quality for all of its forward links from the BSRs 102, it is natural for the mobile 204 to determine the best serving BSR 102 for its forward link. Then the selection is forwarded to the PFA to finalize the decision. As for the reverse links from the mobile 204, involved BSRs 102 assess the channel quality and decide among themselves (via a central decision-making entity such as the PFA, for example) upon the best cell serving the reverse link for the mobile 204.

On the other hand, to simplify the design and to reduce associated signaling overhead, a network designer may prefer to use the same base station to serve both links for the mobile 204. In this case, each mobile 204 has one single active set of BSRs 102 to serve both its forward and reverse links. In one embodiment of the instant invention, the best combined channel quality for both forward and reverse links is used as a criterion in determining the serving BSR 102 for a given mobile 204. Examples of such combined quality include: 1) a weighted sum of time-averaged pilot SINR for forward and reverse links; and 2) the minimum time-averaged pilot SINR for forward and reverse links between the mobile 204 and a BSR 102 in the active set. As a mobile 204 can readily assess the quality of all of its forward links from various BSRs 102, with information about reverse-link quality received from the BSRs 102, a mobile 204 can then select its best cell based on the specified criterion. Similar to the case of separate BSRs 102 for forward and reverse links, the PFA can overwrite the best cell-site selection by the mobile 204 due to factors such as traffic loading.

The FCSS request to switch cells may be triggered in several ways. In the following discussion a single serving BSR for both forward and reverse links, based on either the weighted sum or the minimum (between the forward and the reverse links) of the time-averaged pilot SINRs, is discussed. If distinct serving BSRs 102 are chosen for forward and reverse directions, then the two BSRs 102 are chosen independently, and the same discussion applies to each direction.

Periodically, at fixed intervals, the mobile compares the weighted sum or the minimum of the time-averaged pilot SINRs from all the BSRs 102 in the active set and chooses the BSR 102 with the largest weighted sum or the largest minimum (between the forward and the reverse links) pilot SINR as the new serving BSR 102. This time-based approach can be combined with time-hysteresis and/or level-hysteresis techniques, discussed below.

Time-hysteresis generally requires that a condition exists for a preselected period of time before a transition is allowed to occur. For example, if the weighted sum or the minimum of the time-averaged pilot SINRs on the forward and reverse links connecting the mobile to a BSR 102 (other than the serving BSR) remains above that of the serving BSR 102 for a period exceeding a certain time threshold, then a request is made to switch the connection from the current serving BSR 102 to that particular BSR 102.

Level-hysteresis generally requires that a condition exceeds a setpoint by a preselected magnitude before a transition is allowed to occur. For example, the FCSS request is initiated if the weighted sum or the minimum of the time-averaged pilot SINRs for some BSR 102 in the active set exceeds that for the current serving BSR 102 by a preselected margin.

A combination of time-hysteresis and level-hysteresis may be used to control a transition between serving BSRs 102. Here, the FCSS request is initiated if the weighted sum or the minimum of the time-averaged pilot SINRs for some BSR 102 in the active set exceeds that for the current serving BSR 102 by a preselected threshold for an interval longer than a preselected time period.

The choice of one of the above strategies as a trigger mechanism is dependent on multiple criteria. Timer based algorithms are based on regular synchronous triggers and are therefore easy to implement. If the timer period is too small, the system overhead may dominate, whereas a large timer value can lead to performance degradations. Time and level hysteresis triggers are asynchronous triggers. Performance of level hysteresis algorithms may depend on the choice of threshold, whereas time hysteresis based algorithms may lead to too many FCSS switching events without significant performance gain. If complexity of the control algorithm does not add significant overhead, a combination of time and level hysteresis may give the best performance in some applications.

The following describes one embodiment of the operational timeline for the FCSS procedure.

Each mobile 204 alternates between two operating states: Active and Suspending State. When a mobile 204 is in the Active State, it can decide, according to pre-specified criteria such as signal strength, upon the best cell site (i.e., BSR) to receive data from (respectively the best cell site to transmit data to). If the best cell site is different from the current serving cell, the mobile 204 leaves the Active State and enters the Suspending State. During the Suspending State, the mobile 204 constantly monitors the channel quality to each BSR 102 in the network active set and collects channel statistics. The duration of this state, referred to as Suspension Time, is a tunable parameter but should be long enough to provide adequate averaging of channel quality to avoid excessive and inaccurate cell switching. In a way, the tunable duration controls the speed and aggressiveness of the FCSS procedure. That is, a long Suspension Time provides stable estimation of the averaged channel quality but becomes less capable of tracking fast channel variations and utilizing cell-site diversity. A short Suspension Time, on the other hand, could lead to spurious cell switches.

The choice of the appropriate Suspension Time depends on hardware implementations, mobile speed, quality of channel estimation as well as delay characteristics of the backhaul network. For low mobility and instantaneous channel estimation and prediction, it is feasible to track channel variations and switch between cells for capacity gain without overburdening mobile hardware. As the mobile's speed increases, the gain of FCSS diminishes since FCSS can no longer track fast channel variations for diversity gain.

Figure 4:
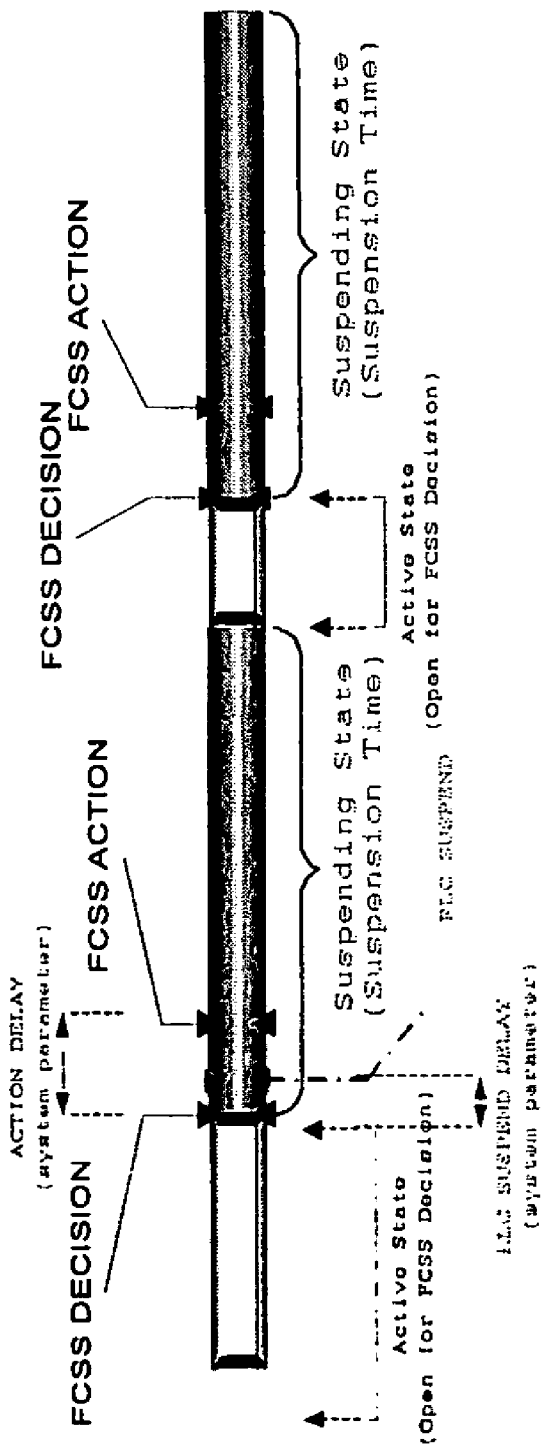
FIG. 4 stylistically depicts a timeline representation of a Fast Cell-Site Selection (FCSS)

FIG. 4 shows an FCSS operation timeline where each white rectangle represents the time duration during which the mobile 204 is in Active State, and is in the process of making a decision to switch to a new cell (to be referred to as an FCSS Decision). Each FCSS Decision triggers the mobile 204 to leave the Active State and enter the Suspending State, represented by a gray rectangle in FIG. 4. The operation of switching the mobile 204 from one cell site to another is referred to as FCSS Action. In an ideal situation, each FCSS Decision is immediately followed by the subsequent FCSS Action. However, such a practice is restricted in practical systems due to non-negligible signaling delays and hardware limitations. The time gap between an FCSS Decision and its associated FCSS Action is referred to as the Action Delay. A short Action Delay is beneficial to realize the gain of FCSS and to preserve the accuracy of the FCSS decision at the time of FCSS Action.

After an FCSS Decision, the current serving BSR 102 and the next serving BSR 102 should prepare for the FCSS Action. Aside from being ready for transmission, one significant factor is data and state synchronization at the MAC level between the two BSRs, so as to avoid unnecessary packet losses or duplicate packet transmissions. One approach to achieve this synchronization, assuming the Action Delay is relatively small compared to Suspension Time, is to suspend data transmission at both the MAC and RLC layers shortly after each FCSS Decision and resume data transmission at the time of FCSS Action. Negative impacts due to such suspension should be relatively small for cells serving multiple users since the BSRs 102 could utilize this time period to serve other users. This is especially true for systems employing channel-aware scheduling algorithms. Furthermore, the system should be designed such that the time duration of transmission suspension due to FCSS is not significantly longer than Action Delay, which is the minimum amount of time to complete the FCSS operations. This is particularly so for scenarios where the same BSR 102 serves both the forward and reverse links for a given mobile 204. In the case of a single BSR 102, both transmissions on both links are halted by the suspension.

As part of the FCSS Action, the MAC protocols at both the serving BSR 102 and the mobile 204 are reset and a status report for each RLC entity associated with the mobile 204 is generated and forwarded to the next serving BSR 102 to prepare for FCSS Action. As the new serving BSR 102 does not have any information regarding MAC protocol state at the current serving BSR 102, resetting the MAC protocol state would avoid signaling overhead of transferring the entire MAC protocol information from the current serving BSR 102 to the new serving BSR 102. A reset of the mobile MAC protocol, however, does not require the reordering buffers to be flushed, but rather, the contents of the reordering buffers is delivered to higher layers.

In the conventional centralized architecture, the Packet Data Convergence Protocol (PDCP) and Radio Link Control (RLC) protocols (or their equivalent protocols) terminate at the RNC, and the Medium Access Control (MAC) protocol runs at the traditional base stations or base station controllers. To support FCSS in the centralized architecture, one embodiment of the invention is to transfer the MAC protocol state from the current serving BSR 102 to the next serving BSR 102. However, such MAC state transfer will incur much overhead for two reasons. First, the MAC state typically changes according to fluctuations of channel quality. Rapid changes in the MAC state due to fast changes in channel quality can make synchronization at the MAC level among involved BSRs 102 difficult to achieve. Second, to capture all necessary information, the MAC protocol state usually involves more data than the RLC level does. Since cell switches can occur relatively fast, frequent transfer of MAC protocol state between the BSRs 102 may generate a considerable amount of overhead and cause unacceptable delay in the backhaul network, thus possibly reducing the effectiveness of FCSS.

For these reasons, coupled with the fact that PDCP, RLC and MAC protocols all run on the BSRs, in another embodiment of the instant invention, the proposed architecture includes only transfer of RLC protocol state from the current serving BSR 102 to the next serving BSR 102 as part of the FCSS operation. In contrast, to avoid overhead for MAC state transfer, the new serving BSR 102 simply resets the MAC protocol state. Since the flow-control window between the RLC and MAC protocol level is usually small, this approach would reduce data loss and duplicate transmission without incurring significant overhead in the backhaul network.

To enable efficient FCSS operations, PDCP and RLC functions may be implemented in a distributed manner where control information associated with a given call is distributed and replicated at more than one BSR 102 in the network active set. The distributed RLC implementation supports fast and seamless RLC (state) transfer where only a limited amount of RLC information is transferred among the BSRs 102 in the active set involved and affected by the switch of the serving BSR 102.

Figure 5:
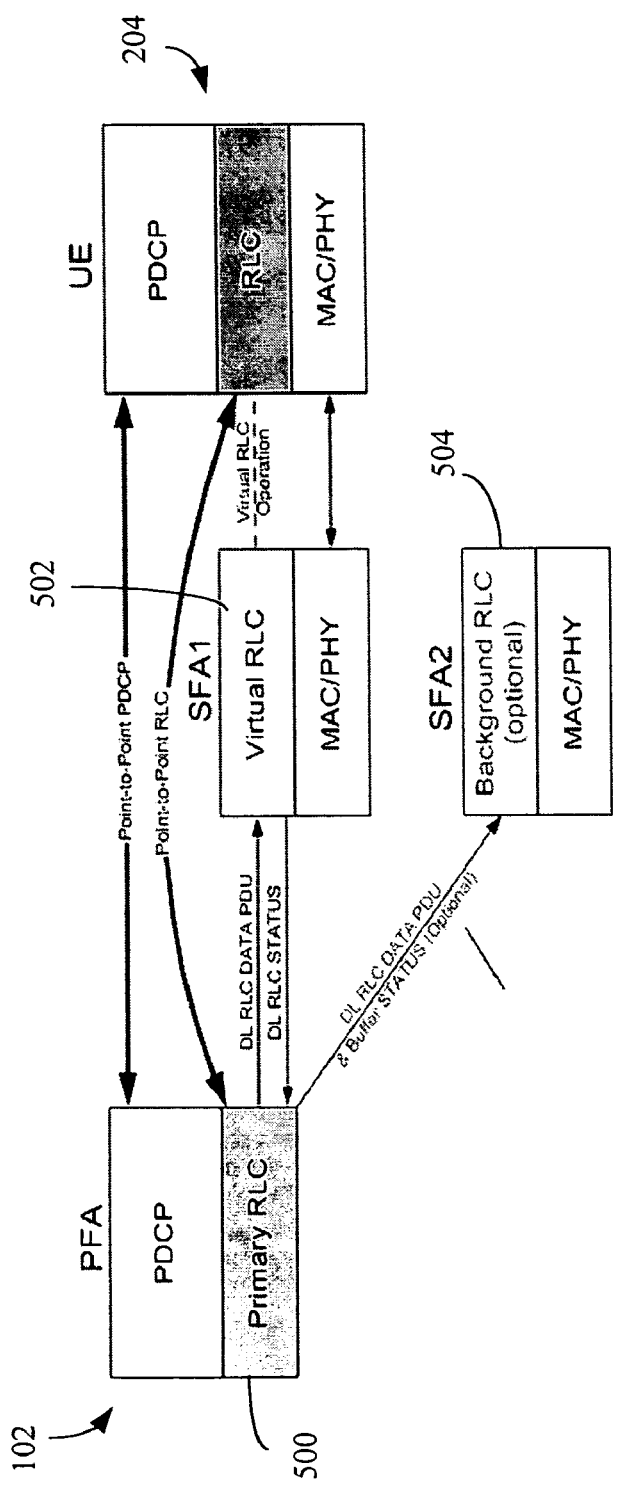
FIG. 5 stylistically depicts the relationship between a Primary Foreign Agent (PFA), Secondary Foreign Agents (SFAs) and a mobile.

In one embodiment of the instant invention, the distributed PDCP/RLC is implemented such that the PDCP/PPP resides on the PFA. Generally, the standard PDCP or PPP protocols (or their equivalent) are implemented only at the PFA. In this manner, the point-to-point PDCP/PPP connections between each mobile 204 and its designated PFA is maintained without affecting mobile implementations, and frequent PDCP/PPP state transfer due to FCSS are avoided or at least reduced significantly. For each mobile 204, the RLC functionalities are split between the PFA and the serving BSR. The RLC instance at the PFA is referred to as the primary RLC (PRLC) 500 and that at the serving BSR 102 is referred to as the virtual RLC (VRLC) 502, as shown in FIG. 5.

The PRLC 500 provides most RLC functions that are defined by the 3GPP and 3GPP2 standards, including segmentation and reassembly, concatenation and padding, in-sequence delivery of upper-layer packet data units (PDUs), duplicate detection, flow control, protocol error detection and recovery, ciphering, service data unit (SDU) discarding, etc. For forward link transmissions, the PFA segments each upper layer packet into multiple RLC-PDUs and reassembles multiple RLC-PDUs into an IP packet for multicast by PFA via the backhaul network to all or a selected subset of SFAs in the network active set. The subset can be chosen dynamically and intelligently by the PFA based on system loading and channel characteristics. The purpose of reassembling the multiple RLC-PDUs into an IP packet is to reduce protocol overhead in the backhaul network.

On the serving BSR 102, the VRLC 502 handles RLC-PDU transmission, error recovery/retransmission, polling, etc. The VRLC 502 is also responsible for periodic update and synchronization of RLC protocol state among all or a subset of BSR 102 in the active set directly or via the PFA. The purpose of such periodic updates is to synchronize the BSRs 102 for efficient FCSS. Since an IP packet is segmented into multiple RLC-PDUs, synchronization at the RLC-PDU level avoids, or at least significantly reduces, unnecessary packet loss and duplicate transmission. As the cell switch begins, the old serving BSR 102 and its associated VRLC 502 start to transfer the RLC protocol state, suspend further RLC transmission and poll the mobile 204 to obtain the most up-to-date RLC STATUS report. Combining this report with other RLC state information already existing at the new serving BSR 102, the latter can quickly obtain the complete RLC protocol state to resume transmission and reception for the mobile 204.

Additionally, in some embodiments of the instant invention, it may be useful to replicate partial RLC state information on all or at least a subset of SFAs that are not the serving BSR 102 in the active set. In this way, if one of these BSRs 102 subsequently becomes the serving BSR 102, it will already maintain at least a portion of the RLC state information so that the complete RLC protocol state may be quickly established.

An instance of background RLC (BRLC) 504 is started on a BSR 102 when it first joins the active set for a given mobile 204. Each BRLC 504 instance is responsible for updating transmission buffer status (i.e., indicating which RLC-PDUs have been transmitted), based on RLC update and synchronization messages from the serving BSR 102 or the PFA, or upon receiving forward-link RLC-PDUs from the PFA. This allows fast synchronization among the BSRs 102 of the active set and reduces the amount of signaling overhead associated with RLC transfer during a switch of the serving BSR 102. The BRLC 504 is changed into the VRLC when the associated BSR 102 becomes the serving BSR 102 for the mobile 204.

For FCSS, limited amount of RLC information may be transferred among BSRs 102 in the active set involved in and affected by the switch of the serving BSR 102. When a switch of the serving BSR 102 is initialized, the old serving BSR 102 and the residing VRLC 502 need to synchronize with the next serving BSR 102 by transferring partial RLC protocol state information. Such information includes send state variable, acknowledge state variable, receive state variable, etc., as well as information related to power control if the transmission uses the power-controlled mode. As the new serving BSR 102 already contains all the RLC-PDUs that are waiting to be transmitted/retransmitted (due to packet multicast from the PFA), no transfer of user data is needed, thus enabling a fast cell switch. Further, since part of the RLC state information is available (replicated) at each base station in the active set, only a limited amount of up-to-date state information is transferred for FCSS among involved base stations. Thus, the associated signaling overhead is significantly less than that of full RLC protocol transfer. The seamless RLC transfer can be completed quickly, thus minimizing transmission disruption for any mobile 204.

Note that RLC state transfer is only necessary if the RLC operates in an acknowledged mode. When RLC operates in a transparent or unacknowledged mode, which does not perform any retransmission, synchronization can be achieved simply by providing and updating the sequence number of the RLC-PDU that is to be transmitted next.

No synchronization of the MAC protocol level is necessary among BSRs 102 in the active set. In the proposed architecture, only the serving BSR 102 keeps track of the MAC protocol state. To reduce signaling overhead, the MAC state information is not updated at other BSRs 102 in the active set for a given mobile 204. For FCSS, one approach is to transfer the entire MAC protocol state from the current serving BSR 102 to the new one. However, to avoid excessive signaling overhead and achieve fast cell switching, the MAC protocol state is reset at the new serving BSR 102 and the mobile 204 according to the 3GPP/3GPP2 standards.

It may be useful to consider RLC operation procedures where forward and reverse links have the same serving BSR 102 for a given mobile 204. For forward link transmissions, the PRLC 500 on the PFA segments upper layer data into RLC-PDUs of appropriate size defined by the Radio Resource Control (RRC), and concatenates multiple RLC-PDUs into an IP packet to be multicast via backhaul networks to a subset or all the SFAs in the active set. The VRLC 502 on the serving BSR 102 transmits RLC-PDUs to the mobile 204 and extracts RLC-STATUS for the forward link from each received RLC-STATUS-PDU or from information piggybacked in the reverse link RLC-PDUs. The VRLC 502 then updates the RLC protocol state on the serving BSR 102, discards properly acknowledged forward link RLC-PDUs from the transmission buffer and arranges timely retransmissions for non-expired and negatively acknowledged RLC-PDUs. The VRLC 502 also periodically forwards its RLC state information to the PRLC 500 on the PFA and the BRLC 504 on a selected subset of SFAs in the active set for proper synchronization. Hence, the synchronization is achieved at the RLC protocol level. Immediately after an FCSS decision (to switch a mobile 204 from one BSR 102 to another), RLC and MAC transmissions should be suspended at the current serving BSR 102 until the completion of RLC state transfer from the current to the new serving BSR 102 and the MAC state reset at the new serving BSR 102. Upon such completion, the new serving BSR 102 operates with the VRLC 502, while the VRLC 502 instance on the old serving BSR 102 switches to become an instance of BRLC 504.

For reverse link transmissions, the VRLC 502 on the serving BSR 102 receives RLC-PDUs from the mobile 204 and constructs RLC-STATUS-PDU for proper acknowledgement of received data. The VRLC 502 also concatenates multiple received RLC-PDUs into IP packets and forwards them via the backhaul network to the PRLC 500 on the PFA. The PRLC 500 then delivers reconstructed data to the upper layer in a proper sequence. For FCSS, the current serving BSR 102 transfers only part of the VRLC 502 state information to the new serving BSR 102 so that based on the available BRLC 504 state information, the latter can reconstruct a complete, updated RLC state for quick resumption of data transmission for the mobile 204.

In the reverse link, two modes of transmission are permitted: the power-controlled mode of simultaneous transmission of all users, similar to current generation wireless systems, and the scheduled mode of transmission which is similar to high speed packet data transmission in the forward link. While the scheduled mode of transmission with a single/few users is suitable for high data rate transmissions due to in-cell-interference avoidance, this transmission method is not suitable for users that were dormant and need to get back to the active state and add themselves to the pool of users for scheduling.

Turning first to the scheduled (rate-controlled) mode, the serving BSR 102 for a group of mobiles 204 coordinates transmissions by the mobiles 204 such that, at any given time, only one of them is actually transmitting. The choice of which mobile 204 to schedule in a given time slot is made according to the scheduling strategy in use, e.g., Proportional-Fair or channel-aware scheduling and resource allocation algorithms. The objective of the scheduling algorithm typically is to maximize system throughput while conforming to the quality of service (QoS) (e.g. latency and throughput) and fairness criteria for each mobile 204. This usually entails not only determining the time epochs and durations of the transmissions, but also the transmission rates.

The power-controlled mode corresponds to the familiar multiple-access scenario in which more than one of the mobiles 204 supported by the same serving BSR 102 can be transmitting at any given time. As in the current 2G and 3G systems, power-controlled mode is used to mitigate interference and the near-far effect. The serving BSR 102 performs power control on the reverse link transmissions from the mobile 204 by setting a received target SINR and signaling to the mobile 204 to increase (respectively decrease) its transmission power if the received SINR is below (respectively above) the target SINR. The target SINR is initially set at the start of the session, and then re-computed periodically by comparing the achieved Frame Error Rate (FER) to the target FER specified by the QoS for the mobile's class of service. If the achieved FER is lower than the target FER, then the target SINR is decreased, and conversely if the received FER is higher than the target FER, then the target SINR is increased. These changes of target SINR at the serving BSR 102 (called the outer loop power control) occur more slowly than the power control commands from the serving BSR 102 that adjusts the mobile transmission power (called the inner loop power control).

While one embodiment of the instant invention implements fast cell switching on the reverse link similar to the forward link, it should be noted that the concepts of network active set and PFA readily accommodate the possibility of implementing frame selection at the PFA for the power-controlled mode where the loss from not implementing soft handoff can potentially be significant. In this case, multiple BSRs 102 in the active set forward the successfully received RLC packets encapsulated in IP to the PFA for frame selection. A distributed outer loop power control can be implemented to reduce signaling between the BSRs 102 in the network active set.

Simulations have been used to compare the cumulative distribution functions of the mobile transmit powers when frame selection is performed on the reverse link, for the two cases where the individual legs' target SINR values are common (obtained post-selection), or allowed to be set independently based on local link quality estimates. At a 1% Frame Error Rate (FER) level, a 0.57 dB advantage was observed for frame selection with post-selection SINR target selection over frame selection with independently-operating power control loops on the legs. This translates into an increased system capacity of about 14% for frame selection with post-selection.

Note that when the serving BSR 102 is switched in the power-controlled transmission mode, the target FER (as specified by the QoS) and the target SINR, i.e., the targets for the outer and inner power control loops respectively, are transferred from the old serving BSR 102 to the new one. Similarly, during a cell switch in the scheduled mode, the target FER and transmission rate information are transferred from the old serving BSR 102 to the scheduler at the new one. For example, if the Proportional Fair scheduler is used, the average throughput received by a mobile 204, as computed over a chosen time horizon, is transferred from the old serving BSR 102 to the new one.

The forward link transmissions, on the other hand, are based on the scheduled mode where the channel qualities for the forward links are constantly fed back by the mobiles 204 to the serving BSR 102. The serving BSR 102 schedules transmissions to the mobiles 204 based on current channel conditions, user data queue sizes, past transmission history and the negotiated data rates.

The proposed architecture in FIG. 2 makes use of the IP Intranet 104 or backhaul network to provide communication among various network elements. The backhaul network 104 transports both user traffic and control and signaling messages among network elements. The following discussion, however, is primarily focused on transport of the control messages for the FCSS operations, although a brief discussion of the transport of user traffic in the backhaul network is also set forth below.

Despite abundant availability of IP network equipment, the proposed network architecture imposes a key challenge for the underlying IP network. On one hand, since the proposed architecture does not require the BSRs 102 to be synchronized as for soft handoff in existing CDMA systems, the backhaul network 104 can have relaxed quality-of-service (QoS) requirements for data transport in the proposed network. On the other hand, however, to support FCSS for improved network performance, associated signaling and control messages have very stringent requirements for packet delay, throughput and packet-loss probability. Thus, the IP backhaul network 104 should provide adequate QoS to support such control message exchanges among the various network elements. Several alternative approaches to solving these issues are discussed herein. Moreover, the feasibility and associated tradeoffs for application in the considered context is also presented herein. As discussed more fully below, it can be shown that control traffic associated with FCSS is "smooth," thus verifying the feasibility of the proposed architecture without an excessive amount of bandwidth, as would be needed for bursty control traffic in the backhaul network 104.

In general, there are at least two approaches for QoS in IP networks. The first approach is at the IP layer, namely, by use of Integrated Services (IntServ) and Differentiated Services (DiffServ), while the second one is at Layer 2, by use of Multi-Protocol Label Switching (MPLS) protocol. At a high level, IntServ uses the Resource Reservation Protocol (RSVP) for explicit signaling and dynamic allocation of resources along the communication path of a given connection, as a means to guarantee end-to-end performance. Evidently, if there are frequent changes for a connection (e.g., due to handoff), the signaling overhead can be so significant that IntServ becomes unattractive in practice. On the other hand, DiffServ provides a number of service classes such as premium, assured and best-effort classes. For DiffServ, packets are marked and classified at the edge router. Typically, QoS is provided by the router's scheduling mechanism on a hop-by-hop basis. Consequently, DiffServ does not guarantee absolute delay or throughput performance, but rather, provides relative performance differentiation among various service classes. On the other hand, MPLS requires setting up a Label-Switch Path (LSP) between each pair of network elements, and the allocated bandwidth can be guaranteed along the entire path. Thus, desirable QoS for a pre-specified offered traffic load can be achieved by proper bandwidth dimensioning of LSPs.

In terms of capability, IntServ could be appropriate for achieving the stringent QoS requirements for the FCSS operations. It is particularly so because the topology of the radio access network does not change often. As far as control message exchanges among various network elements are concerned, the associated connections remain relatively static in time and the overhead associated with IntServ for connection changes can thus be avoided. Accordingly, IntServ may be a viable option in some applications.

Figure 6:
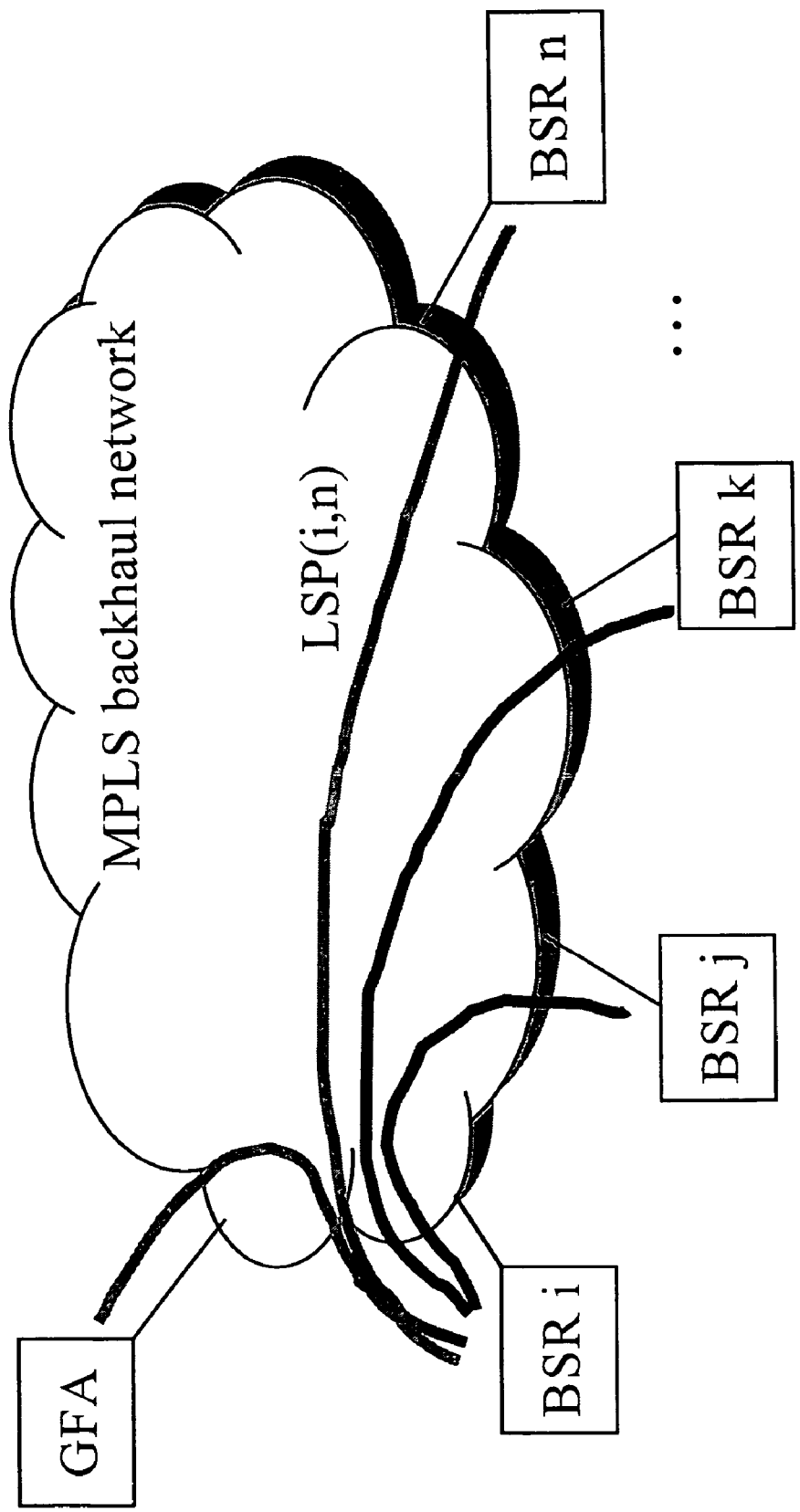
FIG. 6 stylistically depicts an alternative embodiment of the instant invention in which an MPLS approach for transport of control and signaling messages within a backhaul network is shown.

In an alternative embodiment of the instant invention, the MPLS approach for transport of control and signaling messages within the backhaul network 104, as shown in FIG. 6, may be used. In the MPLS approach, appropriate network dimensioning is used to achieve the QoS requirements imposed by the FCSS operations.

Generally, one LSP 600 is set up for each pair of BSRs 102 and between a BSR 102 and another network element such as the GFA 200. Control traffic associated with all calls between a given pair of network elements is multiplexed onto the single LSP 600 between the corresponding network elements. Identity information for each call is included in the higher protocol layers and resolved at the receiving end. Signaling traffic load between each pair of network elements is estimated based on the expected size of control messages and the frequency of such messages. In turn, the messaging frequency depends on call distribution, mobility characteristics and radio conditions in neighboring cells in the actual deployed network. The signaling traffic load can be specified in terms of average, peak or equivalent bandwidth as a requirement for each pair of network elements. Based on the traffic load estimates, existing tools are applied to obtain a set of required LSPs 600 such that their allocated bandwidths are guaranteed. The actual setup of the LSPs 600 in real networks is achieved by the RSVP-TE protocol. Existing MPLS dimensioning tools do not use target end-to-end delay as a performance requirement for generating the LSPs 600 with guaranteed bandwidth allocation along the communication path. Thus, strictly speaking, end-to-end delay performance is not guaranteed in the MPLS network. However, with adequate bandwidth reserved for each of the LSPs 600, QoS for control traffic can be satisfied with a high degree of confidence. Relatively speaking, it is more difficult for the Diff- Serv approach to provide such required QoS by prioritized packet scheduling on a hop-by-hop basis. As pointed out earlier, this approach is feasible particularly because the network topology does not change often. In fact, for improved network performance, the MPLS network 104 may be redimensioned occasionally or periodically based on actual traffic measurements, to adapt to slow changes or the periodic nature of traffic demands.

Based on simulation results, presented below, it can be seen that control traffic associated with the FCSS operations is fairly smooth and does not exhibit significant burstiness. Thus, the MPLS approach with proper backhaul network dimensioning can meet the stringent delay requirement for FCSS.

In some applications, calls (especially those located at cell boundaries) under FCSS may possibly be bounced back and forth among a few BSRs 102 according to fluctuations of link quality. In such cases, as a call is switched from one BSR 102 to the next, the RSVP-TE protocol may be utilized to modify the associated LSPs 600. Rapid changes of BSRs 102 under FCSS may incur substantial protocol overhead and delay, as the LSPs 600 have to be set and reset whenever the mobile 204 switches between the BSRs 102.

In an alternative embodiment, the widely implemented DiffServ service may be used to transport user traffic or control traffic in the backhaul network 104. Of course, the DiffServ approach requires a centralized bandwidth broker to serve as call admission control for ensuring QoS, which introduces additional complexity. Such a centralized broker may potentially be placed at the GFA 200.

In one embodiment of the instant invention, caching data at the secondary agents may be used to increase the likelihood that data may be delivered to the mobile station substantially without interruption even if the secondary agent currently serving the mobile device become unavailable. For example, if a first SFA begins transmitting the data to the mobile, and then the PFA determines that a second SFA should take over serving the mobile device, then control transfers to the second SFA and the communication continues unabated. In one option, data yet to be sent by the first SFA is forwarded from the first SFA to the second SFA. If the request to send data to the mobile device is then switched back to the first SFA, the second SFA forwards the data back to the first SFA. However, this approach may cause congestion and delay in the network between the two SFAs, but such a method may remain useful in some applications. An alternative approach involves the first SFA caching the data that it has initially forwarded to the second SFA. That way, when the first SFA again becomes the serving SFA, part of the outstanding data will still be available at the first SFA. The SFA would then normally only discard cached data after receiving a control message update, stating that a certain amount of data has been successfully transmitted and received by the mobile device.

In an alternative embodiment of the instant invention, the data to be transmitted by the SFA is simultaneously sent to all of the SFAs in the network active set, and control information provided by the PFA points to the starting point for the next serving SFA. In this embodiment, the data need not be forwarded from the old serving SFA to the new serving SFA, as it is already present in each SFA in the network active set. Thus, when the PFA instructs an SFA that it is now to be the serving SFA, it can simply begin transmitting data from its preexisting cache starting at a point in the cache identified by the PFA, or in some cases by the old serving SFA.

The popularity and success of current and future wireless networks depend on their ability to provide reliable communications to mobile users anytime and anywhere. To provide this universal connectivity, the network has to be able to establish and maintain a connection path from source to destination at any given time, independent of the mobile's geographical location. This problem arises specifically in wireless networks due to the user mobility and the fact that there is no single physical point of attachment of the mobile to the network (as is the case in wire-line networks for example).

This broad problem of location management encompasses several aspects: First, during an active call, the network needs to maintain the connection even when the mobile 204 moves in the network. This aspect is usually solved by handoff schemes that connect the mobile 204 to a different BSR 102 if the connection to that BSR 102 becomes stronger than the one to the previously chosen BSR 102 and falls under the FCSS procedures discussed herein. The second aspect of location management deals with radiolocation, which means pinpointing the exact geographical location (as opposed to merely the closest BSR 102) of the mobile 204. Such techniques are useful for emergency services and vehicle and people tracking but are not discussed in any detail herein. The third aspect of location management is to be able to establish a new connection to the mobile 204 when a call destined for that mobile 204 is initiated in the network. The main difficulty stems from the fact that the mobile 204 may have moved from the last known location, and therefore could potentially be anywhere in the network. This problem is essentially solved by the paging and registration procedures, which work in conjunction to determine the closest BSR 102 to the mobile 204 at the time when a connection needs to be established.

In the registration (or update) procedure, the mobile 204 is required to send registration messages to inform the network of its location. Only the relevant registration procedure when the mobile 204 is not active (i.e. when the mobile 204 is not engaged in an ongoing call) is discussed herein. Indeed, when the mobile 204 is active, the network is able to track the mobile through micro- and macro-mobility management procedures (such as the handoff strategies in the traditional cellular networks or the FCSS procedures in the architecture disclosed herein). The registration messages may be sent periodically after expiration of a timer, whenever the mobile 204 moves to a particular location or region in the network, or even when the mobile 204 has traveled a preselected distance away from the location where the last registration occurred. Various well-known registration procedures may be employed without departing from the spirit and scope of the instant invention. Moreover, since these procedures are well known to those of ordinary skill in the art, they will not be discussed in detail herein so as to avoid unnecessarily obscuring the instant invention. Of course more elaborate procedures than the ones mentioned here are also possible and may be employed herein without departing from the spirit and scope of the instant invention.

The second significant procedure is the paging procedure by which the network pages all BSRs 102 in a particular region to locate the mobile 204. Once a BSR 102 receives a paging request from the network, it sends a paging message over its paging channel with a unique identifier for the mobile 204 that needs to be located. Mobiles 204 that are powered up are required to periodically monitor the paging channels and respond to paging messages with their identifier. Ordinarily, when a mobile 204 is not powered up, it will not respond to the paging request, resulting in an unsuccessful connection, and no location information is exchanged. The paging procedure uses a list (called the location area) of possible BSRs 102 at which the mobile 204 may be located (this list may potentially even include all the BSRs 102 in the network). Paging procedures differ by the order in which the various BSRs 102 in the location area are paged. For example, simultaneous or sequential paging of the BSRs 102 may be employed. The order in which the BSRs 102 are paged is part of the design of the paging strategy and depends on such parameters as the mobile speed and direction of movement, the call arrival statistics and any a priori information about the mobile's possible location.

Two basic strategies for paging and registration illustrate the fundamental tradeoffs involved. The always-update strategy requires that the mobile 204 send an update message upon entering a new cell. In other words, when the mobile 204 detects that its signal strength to a BSR 102 has become stronger than that to the current BSR 102, it sends a registration message to inform the network of that change in relative signal strength. Of course, for such a strategy the paging cost is zero, as the network is always aware of the BSR 102 with the best connection to the user. On the other hand, the registration cost (and the associated power consumption for the mobile 204 and registration traffic and signal processing) could be very large, especially if the user is highly mobile.

At the other extreme, in the never-update strategy, the mobile 204 never sends any registration messages, thereby requiring network-wide paging. The registration cost is, of course, zero, but the paging delay and associated traffic in the backhaul network 104 could become unacceptably large. Therefore, in some applications of the instant invention it may be useful to employ a compromise between these two strategies. The main issues that influence this tradeoff and determine the outcome of the compromise include the cost of registration and paging of the mobile 204, the dissemination, recording and storage of the location information in the network, as well as delay in finding a particular mobile 204 and the probability and cost of an unsuccessful paging request.

The typical paging and registration scenario that is used in currently deployed networks is to define a location area to comprise a certain number of base stations. Those of ordinary skill in the art recognize how to design the location areas and how many and which base stations should be part of a location area. Each mobile 204 is required to register with the network as soon as it is powered up and again when it enters a new location area. By comparing the relative signal strengths of pilot signals sent by the base stations 102, the mobile 204 is able to determine if and when it has moved within the vicinity of a new base station 102. If the mobile 204 has information on the location areas (such as, which base stations 102 belong to which location areas) it can determine that it has left a location area, respectively entered a new location area and initiate the corresponding registration message. Alternatively, if the mobile 204 does not have location area information, the base stations 102 may have such knowledge. Whenever the mobile's signal to a new base station 102 becomes largest, the mobile 204 registers with that base station 102 by transmitting its mobile identification number and the identification number of its previously associated base station 102. If the new base station 102 determines that the mobile 204 has moved across a location area boundary (after comparing the identification numbers with the location area information), the new base station 102 initiates a registration message to the network on behalf of the mobile 204. The identification number of the new base station 102, as well as the corresponding information of the associated location area, is then stored in the location registry database. After this initial registration upon entry into the new location area, the mobile 204 is not required to register again while moving within the same location area. However, more elaborate procedures, such as timer-based or distance-based procedures, coupled with the above described procedure, would lead the mobile 204 to register before leaving its current location area. Such a registration message would only trigger an update of the information of the last known base station 102 with which the mobile 204 registered, but not update the location area information per se.

In location management strategies that are based on location areas, paging of a user is restricted to the base stations 102 in the last known location area. All the base stations 102 within the location area are paged until the mobile 204 is located. The paging could be done simultaneously for all the base stations 102 or in some order if additional information on the user's location is available. In current networks, the location areas are assumed to be the same for all the users in the network.

The traditional paging and registration procedures implemented by current wireless networks may very well be used in one embodiment of the proposed network architecture discussed herein. However, the instant architecture, by virtue of its distributed nature, allows for additional flexibility to distribute the paging and registration functionalities and the corresponding computational complexity and signaling load within the network. Before turning to the distributed paging procedure, the centralized paging procedure as it is envisioned in one embodiment of the distributed architecture is described.

Figure 7:
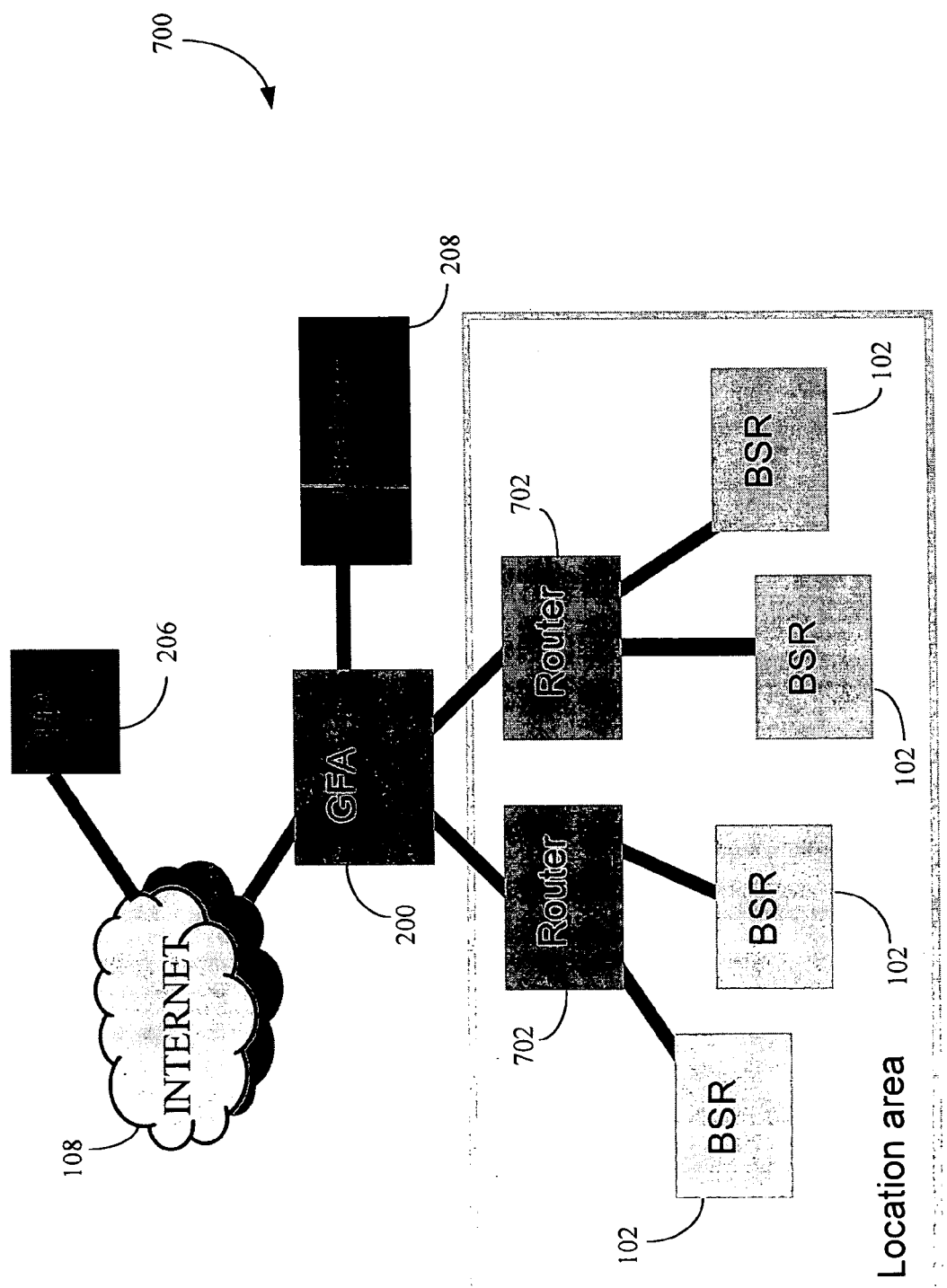
FIG. 7 stylistically depicts an illustrative network configuration in which different BSRs are connected to a router and ultimately to the GFA through a hierarchical architecture.

In FIG. 7, an illustrative network configuration 700 in which it is assumed that different BSRs 102 are connected to a router 702 and ultimately to the GFA through a hierarchical architecture. For simplicity and to illustrate the main ideas, it is assumed that all of the BSRs 102 are connected to the GFA 200 through a single router 702. It should be noted that the location area may contain one or more routers 702 and the associated BSRs 102. The GFA 200 contains the location register database in which the relevant location information is stored. Note also that the GFA 200 may be connected to more than one location area, although this is not shown in FIG. 7.

Traditionally, the paging functionality resides at a central location, such as the RNC. However, the instant invention takes advantage of the architecture to distribute this functionality throughout the network configuration. One embodiment of the paging procedure is discussed below in conjunction with FIG. 7.

If a correspondent host in the core network initiates a call, the call is routed to the receiving mobile's Home Agent (HA) 206 in its home network. Through an established binding, the HA 206 then forwards the data packets to the mobile's Foreign Agent (FA), which corresponds to the GFA 200 in the BSR architecture or the RNC in the traditional centralized architecture. The GFA 200, upon probing the location register (LR) database 208 determines the last known location area and sends appropriate paging requests to all the BSRs 102 within said location area in order to locate the closest BSR 102 to the mobile 204 at that time. This could be done in one embodiment of the instant invention by IP-multicasting for the subset (or the totality) of the BSRs 102 that are paged simultaneously. The BSRs 102 then send a Layer 2 paging message to the mobile 204 using the dedicated paging channels. The mobile 204 responds by a page-response message to the BSR 102 from which it detected the paging request message. The BSR 102 that eventually locates the mobile 204 responds to the GFA 200 with a Layer 3 paging response message, which is then forwarded to the HA 206. BSRs 102 that do not locate the mobile 204 may or may not respond by explicit negative acknowledgement (NACK) messages, corresponding to different embodiments of the invention. At that point, the mobile 204 is deemed located and the call setup may proceed. Note that in this scenario, both the paging functionality and the LR are centralized and co-located with the GFA 200. Those skilled in the art will appreciate that the paging functionality could reside in a dedicated paging server located somewhere in the network (instead of being located at the GFA 200).

In the context of the proposed architecture, paging and registration procedures are employed that are substantially similar to those employed in current systems and described in the previous paragraphs. However, in at least one embodiment of the instant invention, it may be useful to distribute the functionalities in the network in order to avoid excessive processing at specific nodes and excessive signaling traffic on certain links in the network. More elaborate paging procedures can also be implemented in the context of this architecture without departing from the spirit and scope of the instant invention, as will be evident to those of ordinary skill in the art.

In this scenario, for illustrative purposes and to avoid unnecessarily complicating the exposition, it is assumed that all the BSRs 102 within the geographical region of interest are regrouped into contiguous location areas. A mobile 204 is again required to register upon entering a location area, but does not necessarily register when moving across the BSRs 102 within the same location area. The determination of when the mobile 204 enters a new location area can be made according to the same procedures as in the centralized architecture. Upon arrival of a new call for a particular user, paging is then restricted to the last known location area.

In one embodiment of the instant invention, the LR database 208 is still centralized and handles the location information of users associated with one or multiple location areas. In one embodiment, the LR database 208 is collocated or associated with a central control entity, such as the GFA 200. In another embodiment, the LR database 208 could also be implemented in a distributed fashion. The paging functionality, however, is distributed and resides with the last base station (BSR$_{13}$ last) at which the mobile 204 was located. BSR_last could be either the BSR 102 with which the mobile 204 registered upon first powering up in the network, or it could be the BSR 102 with which the mobile 204 registered upon entering the current location area. However, if more sophisticated registration procedures are implemented in addition to or on top of the location areas (such as timer-based or distance-based procedures), BSR_last could be selected to be any BSR 102 in the location area.

One embodiment of the corresponding distributed paging procedure is discussed below, assuming that the information of BSR_last is stored in the LR database 208. Upon a call arrival, the receiving mobile's GFA 200 queries the LR database 208 for the information about BSR_last and sends a paging request message to BSR_last. The ensuing Layer 2 paging procedure is unchanged from the centralized paging discussion. If BSR_last is unable to locate the mobile 204, rather than respond to a central paging entity, BSR_last is capable of initiating paging requests to all other base stations 204 within the same location area. The information regarding which BSRs 102 should be paged (i.e., the identities of all BSRs 102 within the same location area) could be stored in each BSR 102, or alternatively could be transmitted to BSR_last during the initial paging request message from the GFA 200. The latter is particularly attractive when the location areas are not fixed and may depend on the particular user, as discussed below with respect to distributed registration. Upon locating the mobile 204, the corresponding BSR 102 sends a paging response message to the LR database 208. The LR database 208 then forwards the paging response message to the HA 206 of the mobile 204 and the call setup may proceed in similar fashion to the centralized paging procedure. In addition, the LR database 208 updates its information on BSR_last to replace the existing information with that of the BSR 102 that just located the mobile 204. Finally, the old BSR_last is informed that the mobile 204 has been located and it may relinquish its paging responsibility for the mobile 204.

In summary, in this distributed paging procedure, the paging functionality that resides with a central entity (such as the RNC) in the centralized architecture is dynamically distributed in the network and resides with the last known BSR 102 for the paged mobile 204. In this embodiment of the instant invention, all the BSRs 102 have the same functionalities and share the paging responsibilities. Since the BSR 102 at which the mobile 204 was last registered depends on the particular mobile and changes over time, the paging load (including the signal processing and management of location information as well as the required signaling traffic in the network) can be more evenly distributed in the network by assigning the paging responsibility to the last known BSR 102. In another embodiment of the invention, a specific BSR 102 is chosen for each location area to handle all the paging functionalities for all or some of the mobiles located in that location area.

It should be appreciated that under both the centralized and the distributed paging procedures for the network described in FIG. 7, the total amount of paging traffic and the total time required to locate a particular mobile are not substantially changed. However, while this is true for an individual user, the distributed paging procedure allows distribution of the overall paging traffic (when multiple users have to be located) more evenly throughout the network. In addition, there is no single point of failure in the network (as would be the case with a dedicated paging server), the processing capabilities, required buffering and traffic distribution are more evenly distributed in the network. By adapting the location area to each user, it is in fact possible, as discussed below, to further balance the paging traffic in the network.

Traditionally, the location areas are the same for all the users in the network and cover a certain set of BSRs 102. The set of BSRs 102 comprising the location areas is statically configured and remains the same for all the users throughout the operation of the network. While such an assumption is certainly reasonable and provides a straightforward solution, calculations show that it leads to an uneven distribution of the registration traffic load in the network. Specifically, only the those BSRs 102 located at the boundary of the location area handle registration traffic, while the BSRs 102 in the interior of the location area do not share the burden.

One goal behind distributed registration is to make sure that the registration traffic is distributed among a large number of the BSRs 102 in the network by choosing different location areas for different users. Location areas essentially form a tiling of the geographical region and different users could be associated with different shifted versions of a common base pattern of location areas. As an illustrative practical example, assume that the BSRs 102 in the network can be partitioned according to two different patterns of location areas $P_1$ and $P_2$. In one embodiment of the instant invention each user is assigned to either $P_1$ or $P_2$ depending on the parity of the user ID for example. In other words, users with even ID numbers are required to register once they cross the location area boundaries as defined by $P_1$, whereas odd-numbered users register whenever they cross location area boundaries defined in $P_2$. In an alternative embodiment of the instant invention, more dynamic ways of assigning users to the different sets of location areas are envisioned to further balance the registration traffic across the network. For example, when the mobile 204 is powered up, the mobile 204 is assigned to a set of location areas with the fewest mobiles 204 assigned to it at that time. Generally, the total amount of registration traffic in the given geographical region is not changed; however, it is no longer confined to a small fraction of the BSRs 102, but can be distributed in a fair and efficient manner throughout the network. Additionally, those skilled in the art will appreciate that the above description may be extended if multiple sets of locations areas are available, and that as the number of sets of location areas increases, so to does the efficiency with which the registration traffic can be balanced in the network. The actual registration procedures are the substantially similar to those previously described and used in current wireless networks, except that the location area boundary and when the registration procedure is invoked are different for each user and can be dynamically adjusted.

Simulation results are now described to illustrate the performance of the proposed architecture. In particular, the performance improvement and the increase in network capacity due to the use of FCSS are exhibited. Simulations also reveal how appropriate dimensioning of the backhaul network allows the architecture to satisfy the stringent delay requirements for FCSS. Those skilled in the art will appreciate that the description of the simulations below only applies to one illustrative example of the architecture and the applications supported by it. Those skilled in the art will be able to use these descriptions to obtain further simulation results.

For real-time traffic like VoIP, one significant performance metric is packet loss rate, i.e., the percentage of packets not delivered to the receiver by the end of the packet's usefulness, defined herein as the packet delay budget. The deadline is an upper bound on the tolerable end-to-end delay. The packet delay is only estimated within the RAN and excludes the delay due to voice codec, core network switching, and play-out buffer. Since MAC retransmissions are applied to recover channel errors, packet losses are mainly due to late packet delivery. As an illustrative example, it is assumed herein that a VoIP session is supported satisfactorily when the corresponding packet loss rate is below a threshold of 2%. The network capacity is represented in terms of the average number of supported VoIP sessions. Due to complexity considerations, call admission control and call dropping mechanisms are not included herein. In this case, the capacity depends on the cell coverage, i.e., the distribution of the average SINR of each mobile 204, and the cell load, i.e., the number of active mobile VoIP users in the system.

Figure 8:
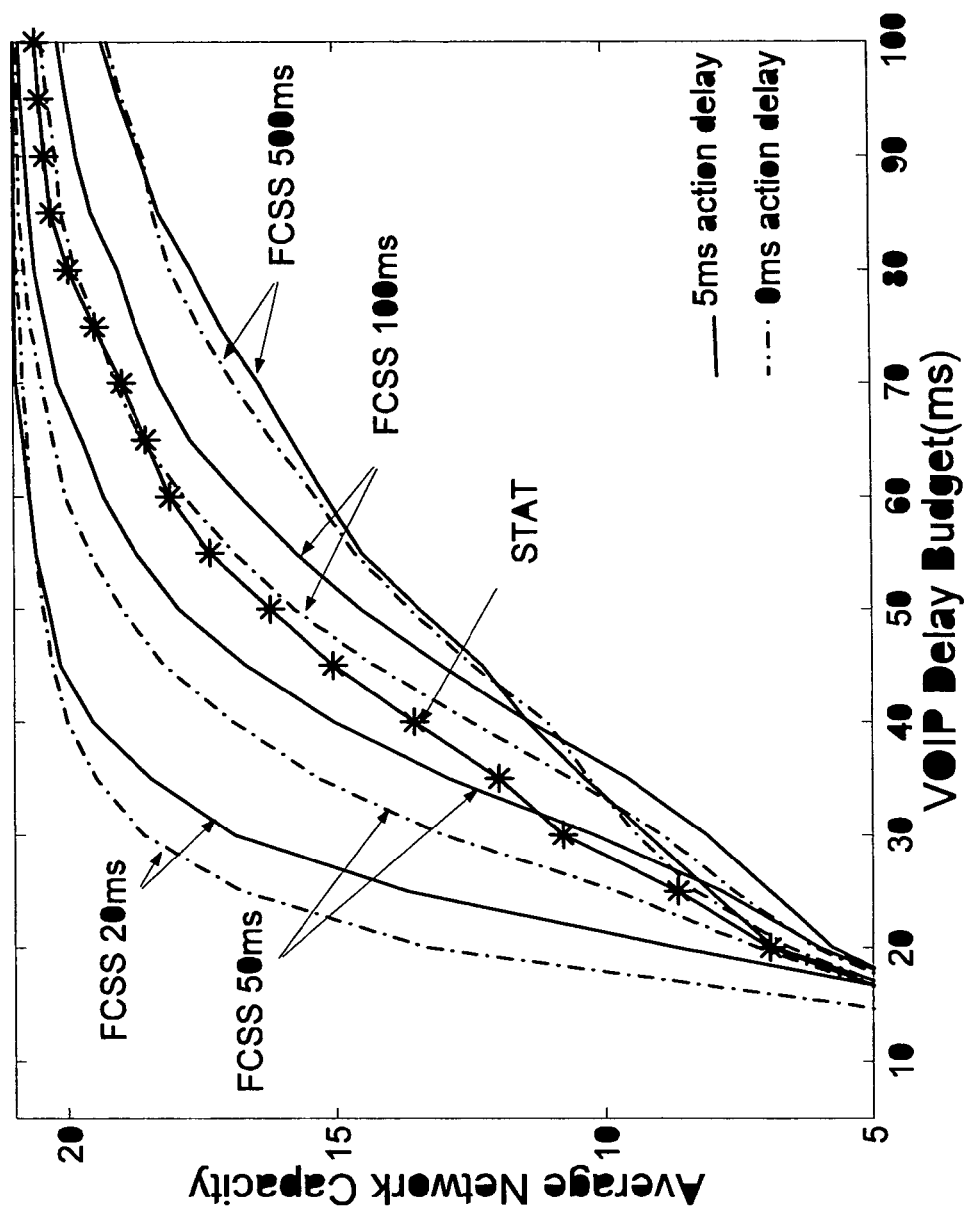
FIG. 8 stylistically depicts a graph of the average number of VoIP users supported as a function of VoIP packet delay budgets for different values of a Suspension Time.

A simulation tool was developed to capture the dynamic processes in a radio network based on the OPNET network simulation tool. The simulated radio network consists of a GFA, a set of BSRs and mobiles. The mobiles share the forward link data channel by time multiplexing. A scheduler at the MAC layer determines the user that is to be served in each time frame. Each scheduling interval or frame lasts 2 msec. The simulated system consists of 3 BSRs at the vertices of an equilateral triangle and 21 users randomly located inside the triangle area between the three BSRs. FCSS is implemented as a means to guarantee delay constraints especially for users near the edges of cells thereby enhancing VoIP capacity in the absence of soft handoff on the shared channels in a CDMA system. Physical mobility of the user has not been considered since it is not necessary to consider path loss variations and shadowing variations in addition to Rayleigh fading (chosen corresponding to a mobile speed of 3 km/h) for the purpose of illustrating the advantage from the proposed schemes at low mobility. FIG. 8 shows the average number of VoIP users supported as a function of VoIP packet delay budgets for different values of the Suspension Time. The network performance when FCSS is disabled and the cell cite for each mobile user is chosen to be the one with the best average channel quality is also simulated. This approach is referred to as "STAT" which is equivalent to FCSS with infinite Suspension Time. Clearly FCSS with a small value of Suspension Time, i.e., 20 msec or 50 msec, achieves significant improvement over a large Suspension Time. Furthermore, an Action Delay of 5 msec only results in 5-10% performance degradation compared to that of ideal FCSS. The loss is mainly attributed to the suspended RLC and MAC transmissions during the time between FCSS Decision and FCSS Action.

The reverse link of the current generation wireless networks primarily works in the variable rate power-controlled mode [3GPP202a][XXX] where all active users transmit simultaneously under tight supervision of the base-station. The base-stations actively monitor and control the transmit power of all the transmitting users. The reverse link transmission is asynchronous and users are inherently designed to be non-orthogonal and hence interfering. Power control mitigates the near-far problem, by tightly controlling the observed interference by each transmitting user. The power-controlled mode of transmission is particularly suitable for continuous, delay-sensitive transmission like voice, where all active users require a fixed reverse link transmission rate. The required transmission rate determines the required SINR and the power control mechanism ensures that the received SINR meets the required SINR. Each user contributes a portion to the Rise over Thermal (RoT) target of each base-station. From these target RoT and SINR requirements the pole capacity of a system, and hence the number of simultaneously supportable users, can be back-calculated.

For the power-controlled mode of transmission, it is assumed that each user has a fixed, continuous target data rate of 144 kbps. For a 1.5 km cell radius, the calculation outlined above shows that 11 active users can transmit simultaneously. Assuming perfect inner loop power control, fast fading effects are substantially compensated. Each user has a maximum transmit power, and transmission is defined to be in outage when the target SINR cannot be reached due to the maximum transmit power limit. In the power-controlled mode, users are allowed to be either in simplex connection, where only one base-station decodes the transmitted frame, or in soft-handoff, where multiple (at most three) base-stations decode the transmitted frame, and frame selection is used at a centralized location (such as the PFA).

The performance of the power-controlled mode on the reverse link is compared with the scheduled mode of transmission. In the scheduled mode of transmission, at each time instant, each base-station schedules only one user to transmit with maximum transmit power. A transmission frame error occurs when the received SINR is not suitable for the transmitted data rate. A maximum of two retransmissions are allowed, and three different retransmission strategies are considered:

1. Simple Retransmission with Frame Selection: Each transmission is considered independently of the previous transmissions. Three SFAs in the active set participate in frame selection and provide spatial diversity.
2. Hybrid ARQ with no Frame Selection: Transmitted data packets are decoded in simplex mode by one base-station. The base station is selected according to FCSS. On error, a NACK signal is sent and the packet is retransmitted. Simple Chase combining of previous transmissions and the retransmitted data is performed before the transmitted packet is decoded.

3. Hybrid ARQ with Frame Selection: This scheme is a combination of the previous two schemes. SFAs in the active set take part in Chase combining and Frame Selection.

Figure 9:
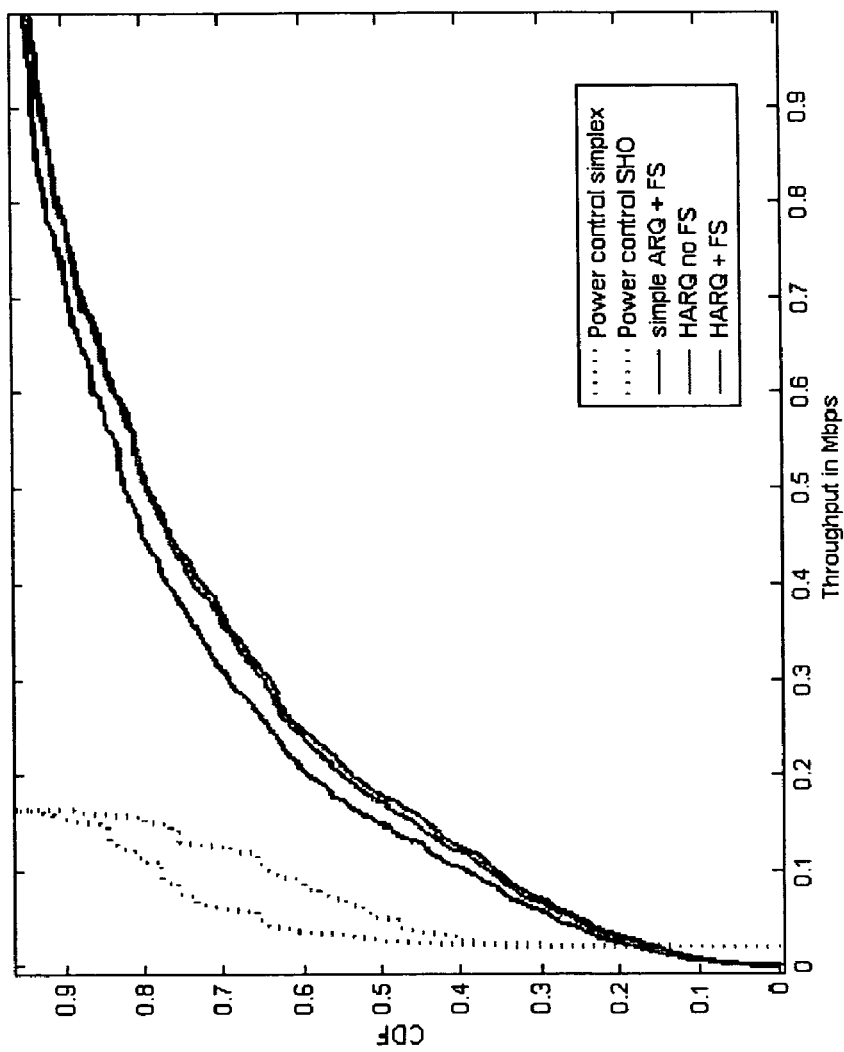
FIG. 9 stylistically depicts a graph of CDF of the achieved throughput versus various transmission strategies.

In FIG. 9, the CDF of the achieved throughput is plotted for the various transmission strategies. As is evident from the results, a significant capacity gain is attained in the scheduled mode of transmission, as compared to the power-controlled mode. In the scheduled mode, Hybrid ARQ in simplex mode outperforms a simple ARQ scheme with Frame Selection. The gain that results from adding the Frame Selection functionality to the Hybrid ARQ scheme in the reverse link is minimal. In the power-controlled mode, some performance improvement in terms of throughput can be achieved if soft handoff is allowed.

Figure 10:
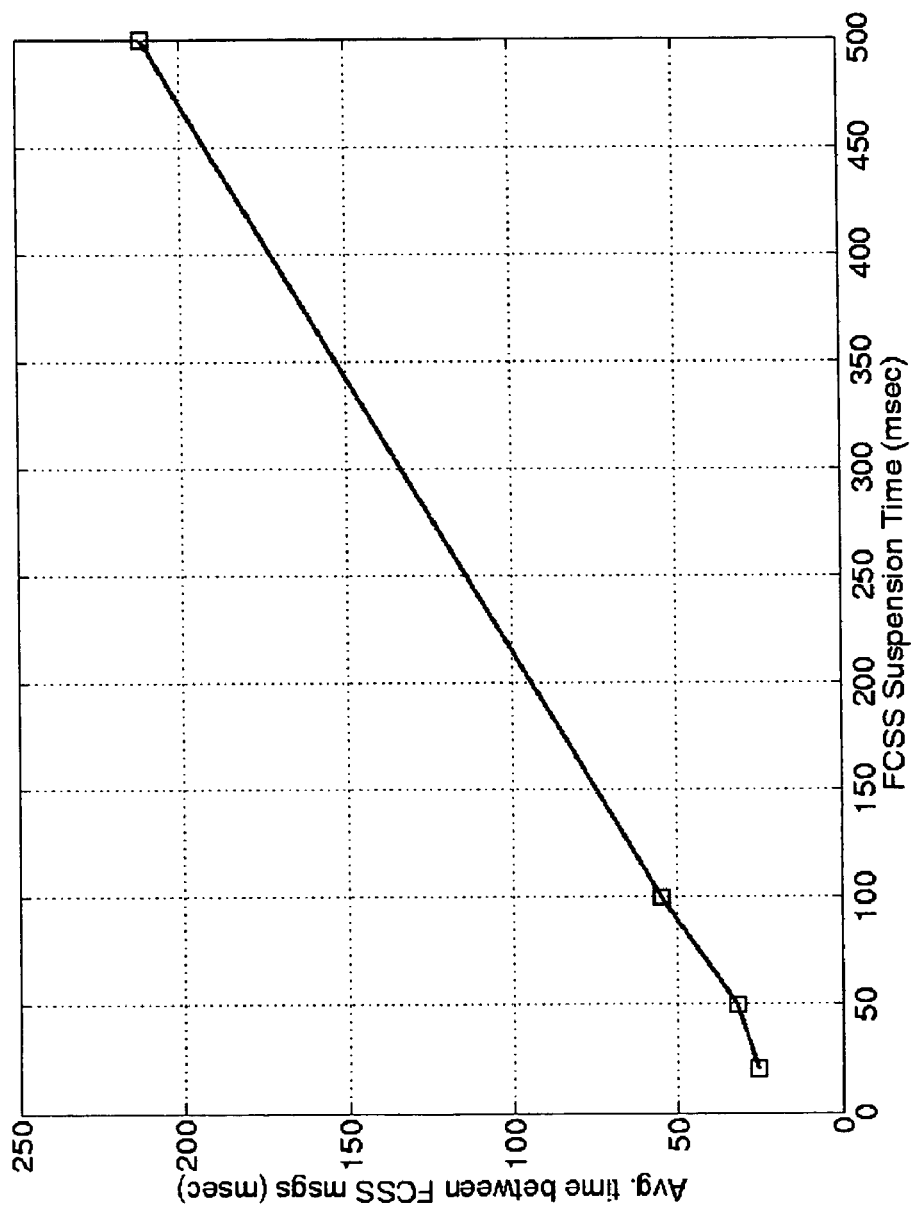
FIG. 10 stylistically depicts a graph of average inter-arrival time as a function of the Suspension Time.

In one embodiment of this instant invention, the use of MPLS is envisioned to support QoS for the control traffic in the backhaul network. In order to verify the feasibility of an MPLS network for transport of control traffic, the arrival process of FCSS messages at the MPLS backhaul network is studied. The FCSS messages are generated from all calls under the control of a given BSR. The idea here is that if arrivals of FCSS messages are highly bursty, then a potentially large amount of bandwidth has to be reserved for each LSP in the MPLS backhaul to meet the stringent QoS requirement for the FCSS. Towards this end, the inter-arrival times of FCSS messages generated by a single BSR in the above simulation model are collected. FIG. 10 shows the average inter-arrival time as a function of the Suspension Time. As can be seen from the graph, as the suspension time increases, the inter-arrival time for FCSS messages also increases because the demand for FCSS is reduced for a longer suspension time.

Figure 11:
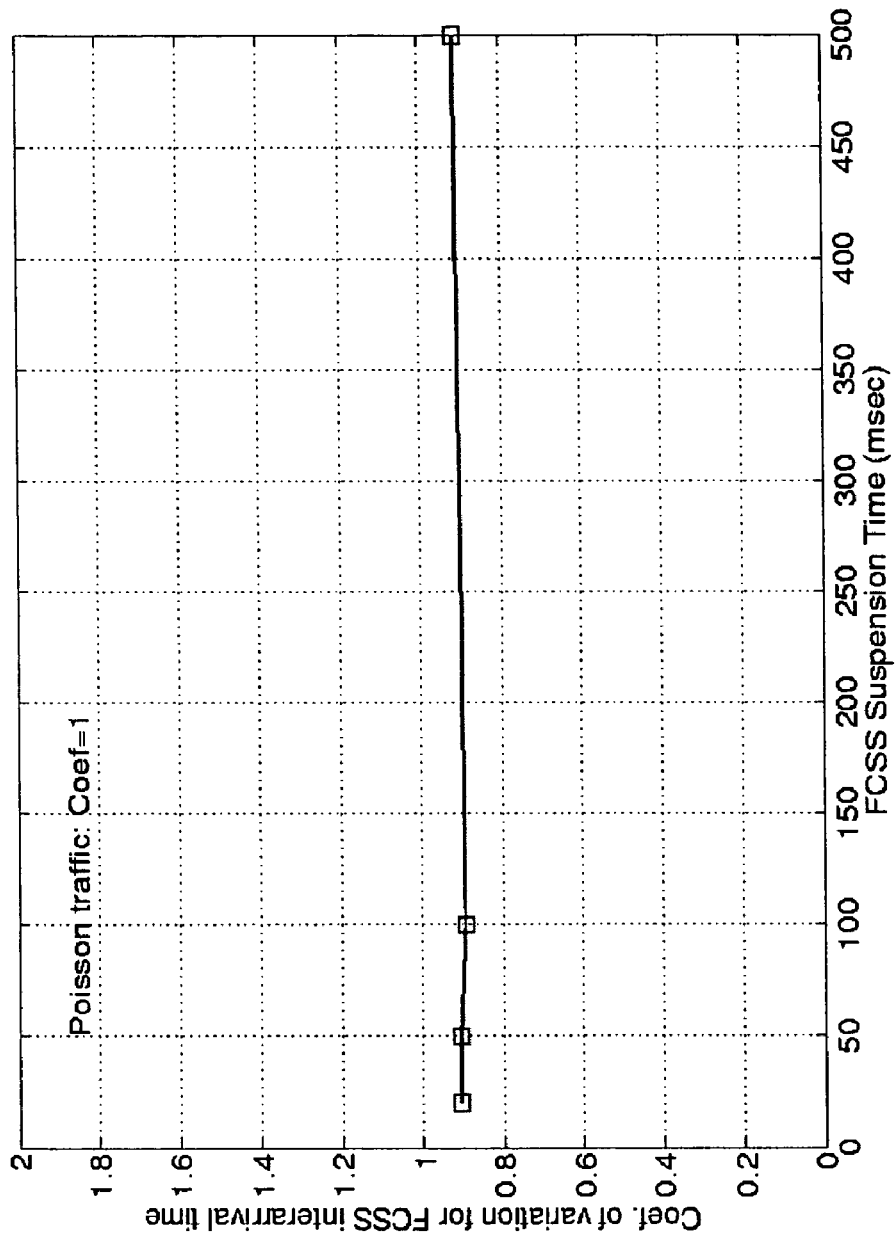
FIG. 11 stylistically depicts a coefficient of variation for the inter-arrival times.

To study the burstiness of the FCSS messages, FIG. 11 shows the coefficient of variation (i.e., the ratio of the standard deviation to the mean) for the inter-arrival times. It is observed that the coefficient is virtually independent of the FCSS suspension time. In addition, the coefficient is about 0.9, which is slightly smaller than 1, its corresponding value for the well-behaved Poisson traffic. In fact, one explanation for such smoothness of FCSS traffic may arise from the following factors. Recall that each call can be "connected" to multiple BSRs with various channel qualities. An FCSS message is generated when the mobile detects that a different BSR has better channel quality than the current one in use. The Suspension Time under consideration is at least on the order of tens of msec, which is much longer than the channel coherence time (during which the channel quality remains similar for any given BSR) for typical radio conditions and mobility. For at least this reason, when a mobile samples the channel quality of each of the BSRs in the active set after the suspension time, the sampled channel qualities become independent of those at the last sampling instant. Combining this with the fact that all BSRs experience independent channel fading, it follows that which BSR has the best quality is independent of the situation at the last sampling time. This may be viewed as a memory-less property. Thus, with a sufficiently long suspension time, the need for switching from one BSR to another appears random in time. In other words, the arrival process of FCSS messages becomes similar to a Poisson process. Based on the results in FIG. 11, it may be concluded that the control traffic associated with the FCSS is very smooth, which helps avoid the need for excessive MPLS bandwidth to handle the traffic burstiness.

The actual control traffic load for the FCSS depends on many factors such as the amount of control information and user data that need to be forwarded from the current BSR to the new BSR. The exact data volume is not known until the final design of the detailed system architecture and the corresponding protocols is completed. To gain preliminary insights on how the MPLS links should be provisioned and to show the feasibility of the proposed distributed network architecture, each MPLS link from one BSR to another is modeled (simulated) as a single server queue. In addition, a BSR generates one message for each FCSS request and the message length is exponentially distributed with a properly adjusted mean to match a given MPLS link utilization. Since control messages typically have higher priority than user packets, the processing delay for control messages at the destination BSR can be neglected when compared with the transmission delay on the MPLS link.

Figure 12:
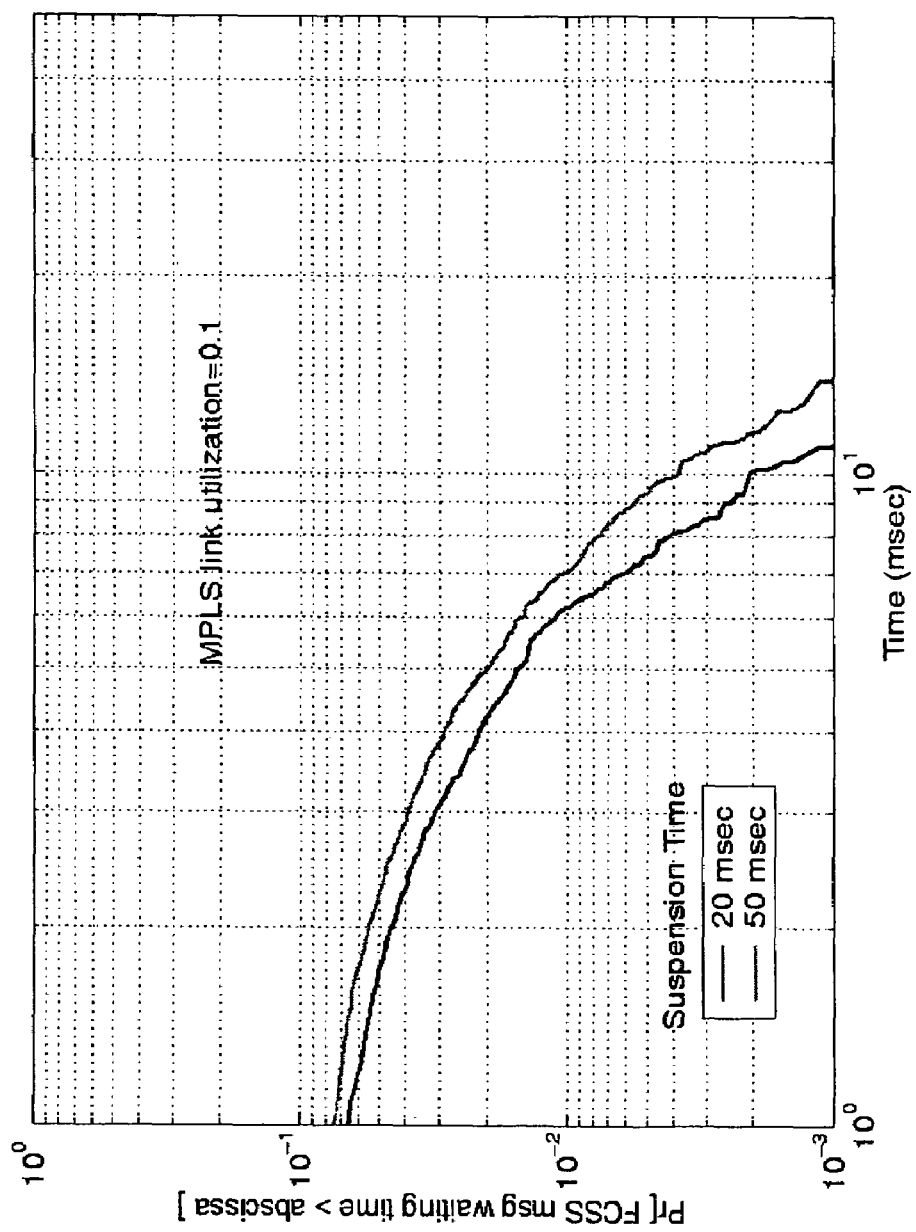
FIG. 12 stylistically depicts a complementary cumulative function for message waiting time when the link has a utilization of 10.

The message waiting time is defined as the time from the generation of the FCSS message until its transmission starts on the MPLS link. FIG. 12 portrays a complementary cumulative function for the message waiting time when the link has a utilization of 10%. As shown in FIG. 12, when the suspension time is 20 and 50 msec, the 98 percentile waiting times are about 4 and 5 msec, respectively. In the case of the shortest suspension time of 20 msec, FIG. 8 revealed that FCSS with an action delay of 5 msec can yield a significant capacity gain. Since a major component of the action delay is the message delay on the MPLS link, having the 98 percentile of message delay of about 4 msec from FIG. 12 reveals a strong possibility of achieving an action delay of 5 msec. In summary, if the MPLS link is dimensioned with adequate bandwidth, the FCSS can yield significant capacity improvement, thus demonstrating the viability of the proposed distributed architecture for CDMA wireless IP networks. It is important to note that the amount of required bandwidth for the MPLS link will be reduced for increased action delay. Obviously, the tradeoff is a decreased capacity gain by the FCSS.

The distributed architecture described herein may be found to be useful in all-IP wireless networks using CDMA-based shared access. Functionalities associated with the fast cell-site selection (FCSS) are distributed among base-station routers for improved network performance. In essence, the proposed architecture together with FCSS provides a unified air-interface and network architecture to supporting multimedia IP applications. Additionally, the instant invention employs a set of protocols and use of MPLS in the backhaul network to support FCSS operations. Furthermore, distributed paging and registration procedures for the proposed architecture have also been described herein. The architecture has the advantages of improved scalability, reliability, and reduced backhaul latencies and also provides cost savings because of the all-IP unified structure.

The simulation results discussed herein show a significant increase in VoIP capacity using FCSS for low mobility in the proposed architecture, when compared with standard cell-site selection techniques. Furthermore, FCSS guarantees good performance for real-time applications such as VoIP in worst case fading scenarios involving rapid changes in shadow fading. As for the MPLS network for transport of control traffic, the results reveal that the control traffic associated with FCSS is quite smooth, thus reducing the need to reserve an excessively large amount of bandwidth to handle bursty traffic on the MPLS link. With proper bandwidth dimensioning, the simulation results show that the MPLS backhaul network can meet the stringent delay requirement of FCSS for performance gains. The feasibility and some of the merits of the proposed architecture for CDMA all-IP wireless networks has been demonstrated.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 220 causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for controlling a communications session with a mobile device in a distributed communication system that includes a plurality of base station routers configured to provide wireless connectivity to the mobile device, comprising:
   selecting a subset of the plurality of base station routers as primary or secondary agents for the mobile device;
   selecting one base station router from the subset of the plurality of base station routers to act as a primary agent for the mobile device and the remainder of the base station routers in the subset to act as secondary agents, wherein the primary agent receives information from a network and controls operation of the secondary agents such that one secondary agent at a time can transmit the received information to the mobile device;
   delivering, from the primary agent to each of the secondary agents, substantially similar data representative of the information received from the network;
   selecting a first one of the secondary agents as a first serving secondary agent to perform all wireless communications with the mobile device until a second serving secondary agent is selected, the first serving secondary agent transferring the data to the mobile device during the communications session; and
   selecting a second one of the secondary agents as the second serving secondary agent to communicate with the mobile device in replacement of the first serving secondary agent, the second serving secondary agent performing all wireless communications with the mobile device until a third serving secondary agent is selected, wherein said wireless communications comprise transferring the data to the mobile device during the communications session.

2. A method, as set forth in claim 1, wherein:
selecting the second one of the secondary agents as the second serving secondary agent to communicate with the mobile device in replacement of the first serving secondary agent further comprises selecting the second one of the secondary agents as the second serving secondary agent to communicate with the mobile device and transmitting the data to the mobile device at a location within the data substantially corresponding to a location in the data where the first one of the secondary agents ceased transferring data to the mobile device.

3. A method, as set forth in claim 2, wherein selecting the second one of the secondary agents as the second serving secondary agent to communicate with the mobile device and transmitting the data to the mobile device at a location within the data substantially corresponding to a location in the data where the first one of the secondary agents ceased transferring data to the mobile device further comprises providing an identification of the location within the data substantially corresponding to a location in the data where the first of the secondary agents ceased transferring data to the mobile device from the first serving secondary agent to the second serving secondary agent.

4. A method, as set forth in claim 1, wherein:
selecting the first one of the secondary agents as the first serving secondary agent to communicate with the mobile device further comprises selecting the first one of the secondary agents as the first serving secondary agent to communicate with the mobile device based on a characteristic of a communications channel between the first serving secondary agent and the mobile device.

5. A method, as set forth in claim 4, wherein:
selecting the second one of the secondary agents as the second serving secondary agent to communicate with the mobile device in replacement of the first serving secondary agent further comprises selecting the second one of the secondary agents as the second serving secondary agent to communicate with the mobile device in replacement of the first serving secondary agent in response to a characteristic of a communications channel between the second serving secondary agent and the mobile device being greater than the characteristic of the communications channel between the first serving secondary agent and the mobile device.

6. A method, as set forth in claim 5, wherein:
selecting the second one of the secondary agents as the second serving secondary agent to communicate with the mobile device in replacement of the first serving secondary agent in response to a characteristic of a communications channel between the second serving secondary agent and the mobile device being greater than the characteristic of the communications channel between the first serving secondary agent and the mobile device further comprises selecting the second one of the secondary agents as the second serving secondary agent to communicate with the mobile device in replacement of the first serving secondary agent in response to a quality of service of a communications channel between the second serving secondary agent and the mobile device being greater than the quality of service of the communications channel between the first serving secondary agent and the mobile device.

7. A method, as set forth in claim 1, wherein:
selecting the first one of the secondary agents as the first serving secondary agent to communicate with the mobile device further comprises selecting the second one of the secondary agents as the second serving secondary agent to communicate with the mobile device in replacement of the first serving secondary agent in response to loading of the second serving secondary agent.

8. A method, as set forth in claim 1, further comprising:
periodically delivering new data to the plurality of secondary agents.

9. A method, as set forth in claim 1, further comprising:
regularly delivering new data to the plurality of secondary agents.

10. A method, as set forth in claim 1, wherein delivering substantially similar data to a plurality of the secondary agents further comprises streaming data to the plurality of secondary agents.

11. A method, as set forth in claim 1, wherein delivering substantially similar data to a plurality of the secondary agents further comprises streaming data to the plurality of secondary agents, and wherein selecting the second one of the secondary agents as the second serving secondary agent to communicate with the mobile device in replacement of the first serving secondary agent further comprises discontinuing streaming of data from the first one of the secondary agents at a first setpoint within the data and beginning streaming data to the plurality of secondary agents from a second setpoint within the data, wherein the first and second setpoints substantially coincide.

* * * * *